United States Patent
Ma et al.

(10) Patent No.: US 12,470,160 B2
(45) Date of Patent: Nov. 11, 2025

(54) STABILITY CONTROL METHOD AND SYSTEM FOR GRID CONNECTED SYSTEM OF DOUBLE-FED WIND FARM

(71) Applicant: NORTH CHINA ELECTRIC POWER UNIVERSITY, Beijing (CN)

(72) Inventors: Jing Ma, Beijing (CN); Yaqi Shen, Beijing (CN); Yitong Xu, Beijing (CN); Yuzhuo Cheng, Beijing (CN); Qiyue Zhang, Beijing (CN)

(73) Assignee: NORTH CHINA ELECTRIC POWER UNIVERSITY, Beijing (CN)

( * ) Notice: Subject to any disclaimer, the term of this patent is extended or adjusted under 35 U.S.C. 154(b) by 414 days.

(21) Appl. No.: 18/196,050

(22) Filed: May 11, 2023

(65) Prior Publication Data

US 2023/0370002 A1    Nov. 16, 2023

(30) Foreign Application Priority Data

May 11, 2022 (CN) .......................... 202210532371.9

(51) Int. Cl.
  *H02P 9/10* (2006.01)
  *H02P 9/00* (2006.01)

(52) U.S. Cl.
  CPC .............. *H02P 9/105* (2013.01); *H02P 9/007* (2013.01)

(58) Field of Classification Search
  CPC .................. H02P 9/105; H02P 9/007
  See application file for complete search history.

(56) References Cited

U.S. PATENT DOCUMENTS

2019/0089279 A1 * 3/2019 Gu .......................... H02P 9/105

* cited by examiner

Primary Examiner — Viet P Nguyen
(74) Attorney, Agent, or Firm — Analects Legal LLC

(57) ABSTRACT

The application relates to a stability-control method and system for grid-connected system of double-fed wind farm, which belongs to the technical field of wind power generation system. The method comprises: collecting operation state parameters of each unit in the system; according to the operation state parameters of each unit, determining a mutual voltage between the units, an interlocking phase angle between the units, and a sub-synchronous current of each unit; according to the mutual voltage between the units, the interlocking phase angle between the units and the sub-synchronous current component of each unit, determining an energy coefficient of each unit, and then obtaining a total energy coefficient; according to the total energy coefficient, regulating the operation state parameters of each unit.

10 Claims, 15 Drawing Sheets

STABILITY CONTROL METHOD AND SYSTEM FOR GRID CONNECTED SYSTEM OF DOUBLE-FED WIND FARM

CROSS-REFERENCE TO RELATED APPLICATIONS

This application claims priority to Chinese Patent Application No. 202210532371.9, filed on May 11, 2022, which is hereby incorporated by reference in their entirety.

TECHNICAL FIELD

The invention relates to the technical field of wind power generation systems, in particular to a stability control method and system for grid connected systems of double-fed wind farms.

BACKGROUND

With the large-scale grid connection of wind turbines, the stability of wind power grid connection has become increasingly prominent. The problem of sub-synchronous oscillation stability of units has gradually become the focus of many experts and scholars at home and abroad.

The existing research focuses on the interaction between wind farm and power grid.

However, the existing technology ignores the interaction between units and reduces the sub-synchronous oscillation stability of units.

SUMMARY

In view of the above, the application aims to propose a stability control method and system for grid connected system of double-fed wind farm, so as to improve the stability of sub-synchronous oscillation of wind turbine generator units.

The purpose of the application is mainly realized through the following technical solutions.

In one aspect, the application provides a stability control method for grid connected system of double-fed wind farm, comprising:

Collecting the operation state parameters of each unit in the system;

According to the operation state parameters of each unit, determining a mutual voltage between the units, an interlocking phase angle between the units, and a sub-synchronous current component of each unit;

According to the mutual voltage between the units, the interlocking phase angle between the units and the sub-synchronous current component of each unit, determining an energy coefficient of each unit, and then obtaining a total energy coefficient;

According to the total energy coefficient, adjusting the operation state parameters of each unit.

Further, the method further comprises:

Collecting an access distance of each unit;

Adjusting the operation state parameters of each unit according to the total energy coefficient comprise:

According to the total energy coefficient, adjusting the operation state parameters of each unit successively in the order of increasing gradually the access distance.

Furthermore, the operation state parameters comprise: d-axis and q-axis components of rotor voltage, d-axis and q-axis components of rotor current, synchronous speed, rotor speed, stator equivalent self inductance under d-q axis system, rotor equivalent self inductance under d-q axis system, stator and rotor equivalent mutual inductance under d-q axis system, rotor resistance, proportional gain coefficient of current inner loop control, integral gain coefficient of current inner loop control, proportional gain coefficient of current outer loop control, integral gain coefficient of current outer loop control, one or more of transmission line resistance, transmission line equivalent reactance and series compensated line capacitance.

Further, the total energy coefficient comprises: total inter machine induction coefficient and total inter machine circulation current coefficient;

The total inter machine induction coefficient refers to the sum of inter machine induction coefficient of each unit;

The total inter machine circulation coefficient refers to the sum of the inter machine circulation coefficients of the each unit;

wherein adjusting the operation state parameters of each unit successively in the order of increasing gradually the access distance according to the total energy coefficient, comprising:

S11. obtaining the total inter machine induction coefficient by is calculating the sum of the inter machine induction coefficient of the each unit;

S12. determining whether the total inter machine induction coefficient is less than a preset value;

If yes, go to step S13; If not, adjusting the operation state parameters of each unit successively in the order of gradually increasing access distance until the total inter machine induction coefficient is less than the preset value;

S13. obtaining the total inter machine circulation coefficient by calculating the sum of current inter machine circulation coefficient of each unit;

S14. determining whether the absolute value of the total inter machine circulation current coefficient is less than the absolute value of the total inter machine induction coefficient;

If yes, the step of adjusting is completed; Otherwise, based on the operation state parameters of a unit with minimum access distance, adjusting the operation state parameters of each unit successively in the order of increasing gradually the access distance until absolute value of the total inter machine circulation current coefficient is less than absolute value of the total inter machine induction coefficient Return to step S11.

Further, the total energy coefficient comprises: total inter machine induction coefficient and total inter machine circulation current coefficient;

the total inter machine induction coefficient refers to the sum of inter machine induction coefficient of each unit; the total inter machine circulation current coefficient refers to the sum of the inter machine circulation current coefficient of each unit;

wherein adjusting the operation state parameters of each unit successively in the order of increasing gradually the access distance according to the total energy coefficient, comprises:

obtaining the total inter machine induction coefficient by calculating the sum of the inter machine induction coefficient of each unit;

determining whether the total inter machine induction coefficient is less than a preset value;

If not, adjusting the operation state parameters of each unit successively in the order of increasing gradually the access distance until the total inter machine induction coefficient is less than the preset value;

Or, obtaining the total inter machine circulation current coefficient by calculating the sum of the inter machine circulation current coefficient of each unit;

obtaining the total inter machine induction coefficient by calculating the sum of the inter machine induction coefficient of each unit;

determining whether absolute value of the total inter machine circulation current coefficient is less than absolute value of the total inter machine induction coefficient;

If not, based on the operation state parameters of a unit with minimum access distance, adjusting the operation state parameters of each unit successively in the order of increasing gradually the access distance until absolute value of the total inter machine circulation current coefficient is less than absolute value of the total inter machine induction coefficient.

Further, the mutual voltage between the units comprises: d-axis component and q-axis component;

The d-axis component and q-axis component of mutual voltage between the units are:

$$\begin{cases} \Delta u_{dkm} = \sum_{m=1, m \neq k}^{N} R\Delta i_{dm} + L\frac{d\Delta i_{dm}}{dt} - \omega_s L \Delta i_{qm} - \frac{1}{(\omega_d - \omega_s)C} \Delta i_{qm} \\ \Delta u_{qkm} = \sum_{m=1, m \neq k}^{N} R\Delta i_{qm} + L\frac{d\Delta i_{qm}}{dt} + \omega_s L \Delta i_{dm} + \frac{1}{(\omega_d - \omega_s)C} \Delta i_{dm} \end{cases}$$

where, $\Delta u_{dkm}$ is the d-axis component of the mutual voltage between the kth unit and the mth unit, $\Delta u_{qkm}$ is the q-axis component of the mutual voltage between the kth unit and the mth unit, R is the transmission line resistance, $\Delta i_{dm}$ is the d-axis component of the sub-synchronous current of the is mth, unit, $\Delta i_{qm}$ is the q-axis component of the sub-synchronous current of the mth, unit, and L is the equivalent reactance of the transmission line; $\omega_d = \omega_s - \omega_n$, $\omega_s$, is the synchronous speed, con is the sub-synchronous oscillation frequency, C is the series compensated line capacitance.

Further, the sub-synchronous current of each unit comprises: d-axis component and q-axis component;

The d-axis component and q-axis component of the sub-synchronous current of each unit are:

$$\begin{bmatrix} \Delta i_{dk} \\ \Delta i_{qk} \end{bmatrix} = \begin{bmatrix} H_1^k & H_2^k \\ -H_2^k & H_1^k \end{bmatrix}^{-1} \begin{bmatrix} G_1^k & G_2^k \\ -G_2^k & G_1^k \end{bmatrix} \begin{bmatrix} 1 & \Delta\theta \\ -\Delta\theta & 1 \end{bmatrix} \begin{bmatrix} \Delta i_{dkv} \\ \Delta i_{qkv} \end{bmatrix}$$

$$= \begin{bmatrix} M_1^k & M_2^k \\ -M_2^k & M_1^k \end{bmatrix} \begin{bmatrix} 1 & \Delta\theta \\ -\Delta\theta & 1 \end{bmatrix} \begin{bmatrix} \Delta i_{dkv} \\ \Delta i_{qkv} \end{bmatrix}$$

$$\begin{cases} H_1^k = R_r + a_2 s \\ H_2^k = -\frac{L_r L_s - L_m^2}{L_s} \omega_2 \\ a_2 = L_r - L_m^2/L_s \end{cases}$$

$$\begin{cases} G_1^k = \left(K_{p3}^k + \frac{K_{i3}^k}{s}\right)\left[-\left(K_{p1}^k + \frac{K_{i1}^k}{s}\right)\frac{L_m}{L_s}U_s - 1\right], \\ G_2^k = -\omega_2 L_r \end{cases}$$

$$\begin{cases} M_1^k = \frac{H_1^k G_1^k + H_2^k G_2^k}{H_1^{k2} + H_2^{k2}} \\ M_2^k = \frac{H_1^k G_2^k - H_2^k G_1^k}{H_1^{k2} + H_2^{k2}} \end{cases}$$

where, $\Delta i_{dk}$ is the d-axis component of the sub-synchronous current of the kth unit, $\Delta i_{qk}$ is the q-axis component of sub-synchronous current of the kth unit, $\Delta i_{dkv}$ is the d-axis component of the sub-synchronous current of the kth unit under the full tracking state of the phase-locked loop, $\Delta i_{qkv}$ is the q-axis component of the sub-synchronization current of the kth unit under the full tracking state of the phase-locked loop. $K_{p3}^k$ is the proportional gain coefficient of the current inner loop control of the kth unit, $K_{i3}^k$ is the integral gain coefficient of the current inner loop control of the kth unit, $K_{p1}^k$ is the proportional gain coefficient of the current outer loop control of the kth unit, $K_{i1}^k$ is the integral gain coefficient of the current outer loop control of the kth unit, $L_s$ is the stator equivalent self inductance under the d-q axis system, $L_r$ is the rotor equivalent self inductance under the d-q axis system, $L_m$ is the stator and rotor equivalent mutual inductance under the d-q axis system, s is the frequency domain operator, and Rr is the rotor resistance, $\Delta\theta$ is the phase locking angle.

Further, the interlocking phase angle between the units is:

$$\Delta\theta_{km} = A_{pll1}^{km} \Delta i_{dm} + A_{pll2}^{km} \Delta i_{qm}$$

$$\begin{cases} A_{pll1}^{km} = -K_{p\_PLL}^k R \frac{1}{\omega_d} - K_{i\_PLL}^k \frac{1}{\omega_d^2}\left[(\omega_d - \omega_s)L - \frac{1}{\omega_d - \omega_s}\frac{1}{C}\right] \\ A_{pll2}^{km} = K_{p\_PLL}^k \frac{1}{\omega_d}\left[(\omega_d - \omega_s)L - \frac{1}{\omega_d - \omega_s}\frac{1}{C}\right] - K_{i\_PLL}^k \frac{R}{\omega_d^2} \end{cases}$$

where, $\Delta\theta_{km}$ is the interlocking phase angle between the kth unit and the mth unit, $\Delta i_{qm}$ is the q-axis component of the sub-synchronous current of the mth unit, $K_{p\_PLL}^k$ is the proportional gain coefficient of the phase-locked loop of the kth unit, $K_{i\_PLL}^k$ is the integral gain coefficient of the phase-locked loop of the kth unit, and R is the transmission line resistance, $\Delta i_{dm}$ is the d-axis component of the sub-synchronous current of the mth unit, $\Delta i_{qm}$ is the q-axis component of the sub-synchronous current of the mth unit, and L is the transmission line equivalent reactance; $\omega_d = \omega_s - \omega_n$, $\omega_s$ is the synchronous speed, $\omega_n$ is the sub-synchronous oscillation frequency, C is the series compensated line capacitance.

Further, determining the energy coefficient of each unit according to the mutual voltage between the units, the interlocking phase angle between the units and the sub-synchronous current component of each unit, comprising:

determining the aperiodic component of the real-time dynamic energy between the units according to the mutual voltage between the units, the interlocking phase angle between the units and the sub-synchronous current component of each unit;

obtaining energy coefficient through derivativing of the aperiodic component;

The aperiodic components are:

$$\Delta W_{km} = \int_t^{t+\frac{2\pi}{\omega}} \Delta P_{ek} d\Delta\theta_{km} + \int_t^{t+\frac{2\pi}{\omega}} \Delta i_{dk} d\Delta u_{qkm} - \int_t^{t+\frac{2\pi}{\omega}} \Delta i_{qk} d\Delta u_{dkm};$$

Where, $\Delta P_{ek}$ is the active power of the kth double-fed unit, $\Delta udkm$ is the d-axis component of the mutual voltage between the kth unit and the mth unit, $\Delta uqkm$ is the q-axis component of the mutual voltage between the kth unit and the mth unit, $\Delta idk$ is the d-axis component of the sub-synchronous current of the kth unit, $\Delta iqk$ is the q-axis component of sub-synchronous current of the kth unit, $\Delta\theta km$ is the interlocking phase angle between the kth unit and the mth unit, $\omega$ is frequency.

In the other aspect, the application provides a stability control system for grid connected system of double-fed wind farm, comprising: acquisition module, data processing module and control module;

The acquisition module is configured to collect the operation state parameters of each unit in the system;

The data processing module is configured to determine the mutual voltage between the units, the interlocking phase angle between the units, and the sub-synchronous current wind of each unit according to the operation state parameters of the unit; to determine the energy coefficient of the units, and then obtain the total energy coefficient according to the mutual voltage between the units, the interlocking phase angle between the units and the sub-synchronous current component of the unit;

The control module is configured to adjust and control the operation state parameters of each unit according to the total energy coefficient.

Compared with the prior art, the technical effect of the application is:

1. Based on the operation state parameters of each unit, the energy flow path and energy correlation in the wind farm and between the wind grids are tracked by using the energy flow interaction characteristics. The energy coefficient is used to characterize the energy relationship between the units and that between the units and the field grid. Then, the operation state parameters of each unit are adjusted according to the energy relationship between the units and the energy relationship between the units and the field grid, so as to improve the damping level of the double-fed unit by giving consideration to the inter unit oscillation mode and the field grid oscillation mode, and to improve the stability and security of the grid operation.

2. The energy coefficient comprises the inter machine induction coefficient and the inter machine circulation coefficient. In this application, the inter machine induction coefficient and the inter machine circulation coefficient have a definite numerical range. The criteria are constructed based on the inter machine induction coefficient and the inter machine circulation coefficient. The parameters of the phase-locked loop and the current loop are adjusted is adaptively, which realizes the quantitative analysis and accurate control of the inter machine interaction, and improves the damping level of the double-fed unit.

3. Different access distances result in different operating parameters of unit, and the above differences are not conducive to system stability. The application adjusts each unit according to the access distance to further improve the operation stability and security of the power grid.

Other features and advantages of the present application will be described in the subsequent specification, and some of them will become apparent from the specification, or will be understood by implementing the present application. The purpose and other advantages of this application can be realized and obtained through the structure specially indicated in the written description and the drawings.

BRIEF DESCRIPTION OF DRAWINGS

The drawings are only for the purpose of showing specific embodiments, and are not considered as a limitation of the present application. In the whole drawings, the same reference symbols represent the same components.

DESCRIPTION OF EMBODIMENTS

Figure 1:
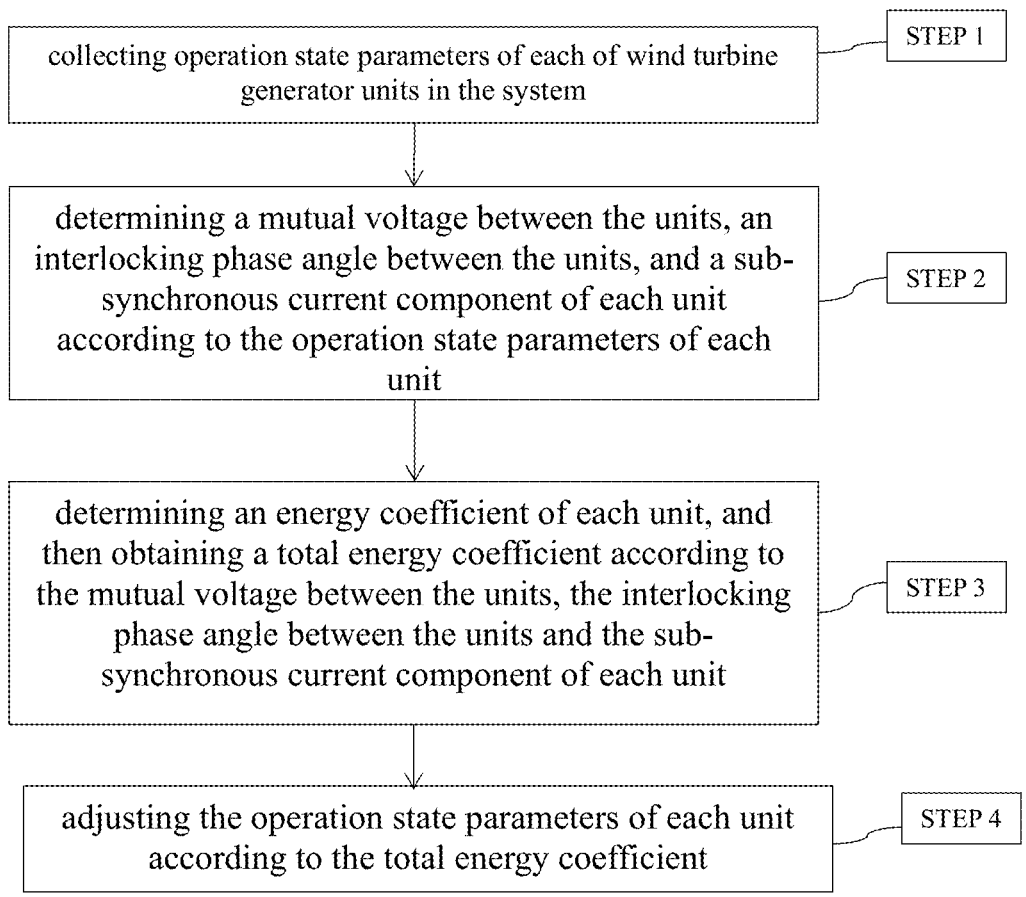
FIG. 1 is the flow chart of stability control method for grid connected system of double-fed wind farm provided in the application.

The preferred embodiments of the application are described in detail below in combination with the accompanying drawings. The accompanying drawings form part of the application and are used together with the embodiments of the application to explain the principle of the application, not to limit the scope of the application.

The differences in the operation status, control parameters, access distance and other factors of each unit in the double-fed wind farm make the coupling between units and the coupling between units and grids complex, and the oscillation modes are diverse. It is difficult to accurately describe the dynamic characteristics of the system by using the unified equivalent model, and it is impossible to accurately reveal the occurrence and development process of the oscillation, which leads to the low stability of the corresponding control strategy, thus affecting the operation stability and security of the grid.

In order to take the operation status, control parameters, access distance and other factors of each unit into consideration when formulating control strategies, the embodiment of the application provides a stability control method for grid connected system of double-fed wind farm, including the following steps:

Step 1. Collecting the operation state parameters of each unit in the system.

In one embodiment of the application, the operation state parameters comprise: d-axis and q-axis components of rotor voltage, d-axis and q-axis components of rotor current, synchronous speed, rotor speed, stator equivalent self inductance under d-q axis system, rotor equivalent self inductance under d-q axis system, stator and rotor equivalent mutual inductance under d-q axis system, rotor resistance, proportional gain coefficient of current inner loop control, integral gain coefficient of current inner loop control, proportional gain coefficient of current outer loop control, integral gain coefficient of current outer loop control, one or more of transmission line resistance, transmission line equivalent reactance and series compensated line capacitance.

Preferably, in addition to the above parameters, it is also necessary to collect the access distance of each unit, in which the per unit value of the equivalent reactance of the line from each unit to the grid point of the wind farm is the access distance.

Step 2. Determining the mutual voltage between the units, interlocking phase angle between the units and sub-synchronous current component of each unit according to the operation state parameters of each unit.

In the embodiment of the application, the energy coefficient is the derivative of the aperiodic component of the real-time dynamic energy, where the aperiodic component is:

$$\Delta W_{km} = \int_{t}^{t+\frac{2\pi}{\omega}} \Delta P_{ek} d\Delta\theta_{km} + \int_{t}^{t+\frac{2\pi}{\omega}} \Delta i_{dk} d\Delta u_{qkm} - \int_{t}^{t+\frac{2\pi}{\omega}} \Delta i_{qk} d\Delta u_{dkm}$$

Where, $\Delta P_{ek}$ is the active power of the kth double-fed unit unit, $\Delta i_{dk}$ is the d-axis component of the sub-synchronous current of the kth unit, $\Delta i_{qk}$ is the q-axis component of sub-synchronous current of the kth unit, $\Delta\theta_{km}$ is the interlocking phase angle between the kth unit and the mth unit, $\Delta u_{dkm}$ is the d-axis component of the mutual voltage between the kth unit and the mth unit, $\Delta u_{qkm}$ is the q-axis component of the mutual voltage between the kth unit and the mth unit. It can be seen from the expression of the aperiodic component that the energy coefficient must be obtained according to the mutual voltage between units (including d-axis and q-axis components), the interlocking phase angle between units and the sub-synchronous current of each unit (including d-axis and q-axis components), and the active power can be obtained through acquisition.

Specifically, the mutual voltage between units comprises: d-axis component and q-axis component;

The d-axis component and q-axis component of mutual voltage between units are:

$$\begin{cases} \Delta u_{dkm} = \sum_{m=1, m\neq k}^{N} R\Delta i_{dm} + L\frac{d\Delta i_{dm}}{dt} - \omega_s L \Delta i_{qm} - \frac{1}{(\omega_d - \omega_s)C}\Delta i_{qm} \\ \Delta u_{qkm} = \sum_{m=1, m\neq k}^{N} R\Delta i_{qm} + L\frac{d\Delta i_{qm}}{dt} + \omega_s L \Delta i_{dm} + \frac{1}{(\omega_d - \omega_s)C}\Delta i_{dm} \end{cases}$$

where, $\Delta u_{dkm}$ is the d-axis component of the mutual voltage between the kth unit and the mth unit, $\Delta u_{qkm}$ is the q-axis component of the mutual voltage between the kth unit and the mth unit, R is the transmission line resistance, $\Delta i_{dm}$ is the d-axis component of the sub-synchronous current of the mth unit, $\Delta i_{qm}$ is the q-axis component of the sub-synchronous current of the mth unit, and L is the transmission line equivalent reactance; $\omega_d = \omega_s - \omega_n$, $\omega_s$ is the synchronous speed, $\omega_n$ is the sub-synchronous oscillation frequency, C is the series compensated line capacitance.

Specifically, the sub-synchronous current of each unit comprises: d-axis component and q-axis component;

The d-axis component and q-axis component of sub-synchronous current of each unit are:

$$\begin{bmatrix} \Delta i_{dk} \\ \Delta i_{qk} \end{bmatrix} = \begin{bmatrix} H_1^k & H_2^k \\ -H_2^k & H_1^k \end{bmatrix}^{-1} \begin{bmatrix} G_1^k & G_2^k \\ -G_2^k & G_1^k \end{bmatrix} \begin{bmatrix} 1 & \Delta\theta \\ -\Delta\theta & 1 \end{bmatrix} \begin{bmatrix} \Delta i_{dkv} \\ \Delta i_{qkv} \end{bmatrix}$$

$$= \begin{bmatrix} M_1^k & M_2^k \\ -M_2^k & M_1^k \end{bmatrix} \begin{bmatrix} 1 & \Delta\theta \\ -\Delta\theta & 1 \end{bmatrix} \begin{bmatrix} \Delta i_{dkv} \\ \Delta i_{qkv} \end{bmatrix}$$

$$\begin{cases} H_1^k = R_r + a_2 s \\ H_2^k = -\frac{L_r L_s - L_m^2}{L_s}\omega_2 \\ a_2 = L_r - L_m^2/L_s \end{cases}$$

$$\begin{cases} G_1^k = \left(K_{p3}^k + \frac{K_{i3}^k}{s}\right)\left[-\left(K_{p1}^k + \frac{K_{i1}^k}{s}\right)\frac{L_m}{L_s}U_s - 1\right] \\ G_2^k = -\omega_2 L_r \end{cases}$$

$$\begin{cases} M_1^k = \frac{H_1^k G_1^k + H_2^k G_2^k}{H_1^{k2} + H_2^{k2}} \\ M_2^k = \frac{H_1^k G_2^k - H_2^k G_1^k}{H_1^{k2} + H_2^{k2}} \end{cases}$$

where, $\Delta i_{dk}$ is the d-axis component of the sub-synchronous current of the kth unit, $\Delta i_{qk}$ is the q-axis component of sub-synchronous current of the kth unit, $\Delta i_{dkv}$ is the d-axis component of the sub-synchronous current of the kth unit under the full tracking state of the phase-locked loop, $\Delta i_{qkv}$ is the q-axis component of the sub-synchronization current of the kth unit under the full tracking state of the phase-locked loop. $K_{p3}^k$ is the proportional gain coefficient of the current inner loop control of the kth unit, $K_{i3}^k$ is the integral gain coefficient of the current inner loop control of the kth unit, $K_{p1}^k$ is the proportional gain coefficient of the current outer loop control of the kth unit, $K_{i1}^k$ is the integral gain coefficient of the current outer loop control of the kth unit, $L_s$ is the stator equivalent self inductance under the d-q axis system, $L_r$ is the rotor equivalent self inductance under the d-q axis system, $L_m$ is the stator and rotor equivalent mutual inductance under the d-q axis system, s is the frequency domain operator, and Rr is the rotor resistance, $\Delta\theta$ is the phase locking angle.

Specifically, the interlocking phase angle between units is:

$$\Delta\theta_{km} = A_{pll1}^{km}\Delta i_{dm} + A_{pll2}^{km}\Delta i_{qm}$$

$$\begin{cases} A_{pll1}^{km} = -K_{p\_PLL}^k R\frac{1}{\omega_d} - K_{i\_PLL}^k\frac{1}{\omega_d^2}\left[(\omega_d - \omega_s)L - \frac{1}{\omega_d - \omega_s}\frac{1}{C}\right] \\ A_{pll2}^{km} = K_{p\_PLL}^k\frac{1}{\omega_d}\left[(\omega_d - \omega_s)L - \frac{1}{\omega_d - \omega_s}\frac{1}{C}\right] - K_{i\_PLL}^k\frac{R}{\omega_d^2} \end{cases}$$

where, $\Delta\theta_{km}$ is the interlocking phase angle between the kth unit and the mth unit, $K_{p\_PLL}^k$ is the proportional gain coefficient of the phase-locked loop of the kth unit, $K_{i\_PLL}^k$ is the integral gain coefficient of the phase-locked loop of the kth unit, and R is the transmission line resistance, $\Delta i_{dm}$ is the d-axis component of the sub-synchronous current of the mth unit, $\Delta i_{qm}$ is the q-axis component of the sub-synchronous current of the mth unit, and L is the transmission line equivalent reactance; $\omega_d = \omega_s - \omega_n$, $\omega_s$ is the synchronous speed, con is the sub-synchronous oscillation frequency, C is the series compensated line capacitance.

It should be noted that the derivation process of the mutual voltage between units, the interlocking phase angle between units, and the sub-synchronous current of each unit is a conventional process, which will not be repeated here.

Step 3. Determining the energy coefficient of each unit according to the mutual voltage between units, the interlocking phase angle between units and the sub-synchronous current component of each unit, and then obtaining the total energy coefficient.

In the embodiment of the application, the aperiodic component of the real-time dynamic energy between units is determined according to the mutual voltage between units, the interlocking phase angle between units, and the sub-synchronous current component of each unit; the energy coefficient is obtained by taking the derivative of the aperiodic component.

The aperiodic component of real-time dynamic energy between units comprises two parts: inter machine induced energy and inter machine circulating energy. Among them, the inter machine induced energy represents the influence of coupling between units on the stability of field network oscillation, and the inter machine circulation energy represents the influence of coupling between units on the stability of inter machine oscillation. In order to enable the protection action to be made before the fault occurs, so as to prevent the fault from occurring, the inter machine induction energy coefficient (derivative of inter machine induced energy) and inter machine circulation energy coefficient (derivative of inter machine circulation energy) are adopted in the embodiment of the application to replace the inter machine induced energy and inter machine circulation energy. It can be seen that the energy coefficient is the sum of the inter machine induction energy coefficient and the inter machine circulation energy coefficient.

Based on the expressions of the inter voltage between units, the interlocking phase angle between units, the sub synchronous current and the aperiodic component of the dynamic energy of each unit, it can be known that the induced energy between units is:

$$\Delta W_{km\_s} = + \int \frac{1}{a_1} \frac{L_m}{L_s} U_s A_{pll1}^{km} I^m I^k \frac{\omega_d}{4} \left( A_{pll1}^k A_{pll2}^m - A_{pll2}^k A_{pll1}^m \right) \left[ |M_1^k M_1^m| \cos(2\varphi_k + \varphi_{M1}^k - 2\varphi_m - \varphi_{M1}^m) + |M_2^k M_2^m| \cos(2\varphi_k + \varphi_{M2}^k - 2\varphi_m - \varphi_{M2}^m) \right] dt +$$

$$\int \frac{1}{a_1} \frac{L_m}{L_s} U_s A_{pll1}^{km} I^m I^k \frac{\omega_d}{4} \left( A_{pll1}^k A_{pll2}^m - A_{pll2}^k A_{pll1}^m \right) \left[ |M_1^k M_2^m| \sin(2\varphi_k + \varphi_{M1}^k - 2\varphi_m - \varphi_{M2}^m) + |M_2^k M_1^m| \sin(2\varphi_m + \varphi_{M1}^m - 2\varphi_k - \varphi_{M2}^k) \right] dt -$$

$$\int \frac{1}{a_1} \frac{L_m}{L_s} U_s A_{pll2}^{km} I^m I^k \omega_d \left[ \frac{|M_1^k M_2^m| \sin(\varphi_m - \varphi_k + \varphi_{M2}^m - \varphi_{M1}^k) + |M_2^k M_1^m| \sin(\varphi_k - \varphi_m + \varphi_{M2}^m - \varphi_{M1}^k)}{2} - \frac{|M_1^k M_1^m| \cos(\varphi_m - \varphi_k + \varphi_{M1}^m - \varphi_{M1}^k) + |M_2^k M_2^m| \cos(\varphi_m - \varphi_k + \varphi_{M2}^m - \varphi_{M2}^k)}{2} \right] dt +$$

$$\int \frac{1}{a_1} \frac{L_m}{L_s} U_s A_{pll2}^{km} I^m I^k \frac{\omega_d}{4} \left( A_{pll1}^k A_{pll1}^m + A_{pll2}^k A_{pll2}^m \right) \left[ |M_1^k M_2^m| \sin(2\varphi_k + \varphi_{M1}^k - 2\varphi_m - \varphi_{M2}^m) + |M_2^k M_1^m| \sin(2\varphi_m + \varphi_{M1}^m - 2\varphi_k - \varphi_{M2}^k) \right] dt +$$

$$\int R I^m I^k \frac{\omega_d}{2} \left( A_{pll1}^k A_{pll1}^m + A_{pll2}^k A_{pll2}^m \right) \left[ |M_1^k M_1^m| \cos(2\varphi_k + \varphi_{M1}^k - 2\varphi_m - \varphi_{M1}^m) + |M_2^k M_2^m| \cos(2\varphi_m + \varphi_{M2}^m - 2\varphi_k - \varphi_{M2}^k) \right] dt -$$

$$\int \left[ (\omega_d - \omega_s) L + \frac{1}{\omega_d - \omega_s} \frac{1}{C} \right] I^m I^k \frac{\omega_d}{2} \left( A_{pll1}^k A_{pll2}^m - A_{pll2}^k A_{pll1}^m \right) \left[ |M_1^k M_1^m| \cos(2\varphi_k + \varphi_{M1}^k - 2\varphi_m - \varphi_{M1}^m) + |M_2^k M_2^m| \cos(2\varphi_k + \varphi_{M2}^k - 2\varphi_m - \varphi_{M2}^m) \right] dt -$$

$$\int \left[ (\omega_d - \omega_s) L + \frac{1}{\omega_d - \omega_s} \frac{1}{C} \right] I^m I^k \frac{\omega_d}{2} \left( A_{pll1}^k A_{pll2}^m - A_{pll2}^k A_{pll1}^m \right) \left[ |M_1^k M_2^m| \sin(2\varphi_k + \varphi_{M1}^k - 2\varphi_m - \varphi_{M2}^m) + |M_2^k M_1^m| \sin(2\varphi_m + \varphi_{M1}^m - 2\varphi_k - \varphi_{M2}^k) \right] dt$$

The circulating energy between units $\Delta W_{km\_x}$ is:

$$\Delta W_{km\_x} = \int - \frac{1}{a_1} \frac{L_m}{L_s} U_s A_{pll1}^{km} I^m I^k \omega_d \left[ \frac{|M_2^k M_1^m| \cos(\varphi_m - \varphi_k + \varphi_{M1}^m - \varphi_{M2}^k) - |M_1^k M_2^m| \cos(\varphi_k - \varphi_m + \varphi_{M1}^k - \varphi_{M2}^m)}{2} + \frac{|M_1^k M_1^m| \sin(\varphi_m - \varphi_k + \varphi_{M1}^m - \varphi_{M1}^k) - |M_2^k M_2^m| \sin(\varphi_k - \varphi_m + \varphi_{M2}^k - \varphi_{M2}^m)}{2} \right] dt -$$

$$\int \frac{1}{a_1} \frac{L_m}{L_s} U_s A_{pll1}^{km} I^m I^k \frac{\omega_d}{4} \left( A_{pll1}^k A_{pll1}^m + A_{pll2}^k A_{pll2}^m \right) \left[ |M_1^k M_1^m| \sin(2\varphi_k + \varphi_{M1}^k - 2\varphi_m - \varphi_{M1}^m) - |M_2^k M_2^k| \sin(2\varphi_k + \varphi_{M2}^k - 2\varphi_m - \varphi_{M2}^m) \right] dt +$$

$$\int \frac{1}{a_1} \frac{L_m}{L_s} U_s A_{pll1}^{km} I^m I^k \frac{\omega_d}{4} \left( A_{pll1}^k A_{pll1}^m + A_{pll2}^k A_{pll2}^m \right) \left[ |M_1^k M_2^m| \cos(2\varphi_k + \varphi_{M1}^k - 2\varphi_m - \varphi_{M2}^m) - |M_2^k M_1^m| \cos(2\varphi_k + \varphi_{M2}^k - 2\varphi_m - \varphi_{M1}^m) \right] dt -$$

$$\int \frac{1}{a_1} \frac{L_m}{L_s} U_s A_{pll2}^{km} I^m I^k \frac{\omega_d}{4} \left( A_{pll1}^k A_{pll1}^m - A_{pll2}^k A_{pll1}^m \right) \left[ |M_1^k M_2^m| \cos(2\varphi_k + \varphi_{M1}^k - 2\varphi_m - \varphi_{M2}^m) - |M_2^k M_1^m| \cos(2\varphi_m + \varphi_{M1}^m - 2\varphi_k - \varphi_{M2}^k) \right] dt +$$

$$\int \frac{1}{a_1} \frac{L_m}{L_s} U_s A_{pll2}^{km} I^m I^k \frac{\omega_d}{4} \left( A_{pll1}^k A_{pll2}^m - A_{pll2}^k A_{pll1}^m \right) \left[ |M_1^k M_1^m| \sin(2\varphi_k + \varphi_{M1}^k - 2\varphi_m - \varphi_{M1}^m) - |M_2^k M_2^m| \sin(2\varphi_m + \varphi_{M2}^m - 2\varphi_k - \varphi_{M2}^k) \right] dt -$$

$$\int R I^m I^k \frac{\omega_d}{2} \left( A_{pll1}^k A_{pll2}^m - A_{pll2}^k A_{pll1}^m \right) \left[ |M_1^k M_2^m| \cos(2\varphi_k + \varphi_{M1}^k - \right.$$

-continued
$$2\varphi_m - \varphi_{M2}^m) - |M_2^k M_1^m| \cos(2\varphi_m + \varphi_{M1}^m - 2\varphi_k - \varphi_{M2}^k)\big]dt +$$

$$\int RI^m I^k \frac{\omega_d}{2} \big(A_{pll1}^k A_{pll2}^m - A_{pll2}^k A_{pll1}^m\big)\big[|M_1^k M_1^m| \sin(2\varphi_k + \varphi_{M1}^k -$$

$$2\varphi_m - \varphi_{M1}^m) - |M_2^k M_2^m| \sin(2\varphi_m + \varphi_{M2}^m - 2\varphi_k - \varphi_{M2}^k)\big]dt + \int [(\omega_d - \omega_s)L +$$

$$\frac{1}{\omega_d - \omega_s} \frac{1}{C}\bigg]I^m I^k \omega_d \begin{bmatrix} |M_2^k M_1^m| \cos(\varphi_m - \varphi_k + \varphi_{M1}^m - \varphi_{M2}^k) - \\ \frac{|M_1^k M_2^m| \cos(\varphi_k - \varphi_m + \varphi_{M1}^k - \varphi_{M2}^m)}{2} + \\ |M_1^k M_1^m| \sin(\varphi_m - \varphi_k + \varphi_{M1}^m - \varphi_{M1}^k) - \\ \frac{|M_2^k M_2^m| \sin(\varphi_k - \varphi_m + \varphi_{M2}^k - \varphi_{M2}^m)}{2} \end{bmatrix} dt +$$

$$\int \bigg[(\omega_d - \omega_s)L + \frac{1}{\omega_d - \omega_s}\frac{1}{C}\bigg]I^m I^k \frac{\omega_d}{2}\big(A_{pll1}^k A_{pll1}^m +$$

$$A_{pll2}^k A_{pll2}^m\big)\big[|M_1^k M_1^m|\sin(2\varphi_k + \varphi_{M1}^k - 2\varphi_m - \varphi_{M1}^m) -$$

$$|M_2^k M_2^m|\sin(2\varphi_k + \varphi_{M2}^k - 2\varphi_m - \varphi_{M2}^m)\big]dt -$$

$$\int \bigg[(\omega_d - \omega_s)L + \frac{1}{\omega_d - \omega_s}\frac{1}{C}\bigg]I^m I^k \frac{\omega_d}{2}\big(A_{pll1}^k A_{pll1}^m +$$

$$A_{pll2}^k A_{pll2}^m\big)\big[|M_1^k M_2^m|\cos(2\varphi_k + \varphi_{M1}^k - 2\varphi_m - \varphi_{M2}^m) -$$

$$|M_2^k M_1^m|\cos(2\varphi_k + \varphi_{M2}^k - 2\varphi_m - \varphi_{M1}^m)\big]dt$$

where, Us is the amplitude of fundamental-frequency voltage, $a_1 = L_m/L_s$, $\varphi_k$ is the sub-synchronous current phase of the kth unit, $\varphi_m$ is the sub-synchronous current phase of the mth unit, $\varphi_{M1}^k$ is the sub-synchronous current phase of the kth unit under M1 state, $\varphi_{M2}^k$ is the sub-synchronous current phase of the kth unit under M2 state, $\varphi_{M1}^m$ is the sub-synchronous current phase of the mth unit under M1 state, $\varphi_{M2}^m$ is the sub-synchronous current phase of the mth unit under M2 state, and $A_{pll1}^k$、$A_{pll2}^k$ are the phase-locked angle coefficient of the kth unit, $A_{pll1}^m$、$A_{pll2}^m$ are the phase-locked angle coefficient of mth unit. $M_1^m$、$M_2^m$ are the coefficients M1 and M2 of the mth unit, whose expressions are the same as $M_1^k$ and $M_2^k$, except that the specific parameters are replaced by the parameters of the mth unit.

The inter machine circulation current coefficient $\Delta\eta_{km\_x}$ and inter machine induction coefficient $\Delta\eta_{km\_s}$ can be obtained by calculating the time derivatives of $\Delta W_{km\_x}$ and $\Delta W_{km\_s}$ respectively.

Step 4. Adjusting and controlling the operation state parameters of each unit according to the total energy coefficient.

In the embodiment of the application, the circulation current coefficient $\Delta\eta_{km\_x}$ and induction coefficient $\Delta\eta_{km\_s}$ between units are mainly current loop parameters and phase-locked loop parameters. Current loop parameters comprise M1, M2 and their combinations. The PLL parameters comprise Apll1、Apll2 and their combinations.

The influence of current loop parameters and phase-locked loop parameters on inter machine circulation current coefficient $\Delta\eta_{km\_x}$ and inter machine induction coefficient $\Delta\eta_{km\_s}$ is discussed below.

For current loop parameters, when there is only difference between the kth unit and the mth unit in current loop control parameters, $\Delta\eta_{km\_s}$ is:

$$n_{mk\_s} = \frac{1}{a_1}\frac{L_m}{L_s}U_s A_{pll2}^{km} I^m I^k \omega_d \frac{|M_1^k - M_2^k||M_1^m - M_2^m|}{2} +$$

-continued
$$\frac{1}{a_1}\frac{L_m}{L_s}U_s A_{pll2}^{km} I^m I^k \frac{\omega_d}{4}\big(A_{pll1}^k A_{pll1}^m + A_{pll2}^k A_{pll2}^m\big)|M_1^k - M_2^k||M_1^m - M_2^m| -$$

$$RI^m I^k \omega_d \frac{|M_1^k - M_2^k||M_1^m - M_2^m|}{2} -$$

$$RI^m I^k \frac{\omega_d}{2}\big(A_{pll1}^k A_{pll1}^m + A_{pll2}^k A_{pll2}^m\big)|M_1^k - M_2^k||M_1^m - M_2^m|$$

The coefficient term $|M_1^k - M_2^k|$ can be expressed as:

$$M_1^k - M_2^k = \frac{G_1^k\big(H_1^k + H_2^k\big) + G_2^k\big(H_2^k - H_1^k\big)}{\big(H_1^{k2} + H_2^{k2}\big)^2}$$

where, $I^k$ is the current amplitude of the kth unit and $I^m$ is the current amplitude of the mth unit. It can be seen from the above two equations that the induction coefficient between generators is always positive at this time, and the induction effect between generators will cause the units in the field to emit dynamic energy during the oscillation, accelerating the wind field oscillation divergence. In addition, with the increase of the current inner loop Kp parameter of the mth unit, $|M_1^k - M_2^k|$ gradually increases. Accordingly, the inter machine induced energy accumulation rate of the kth unit also increases. In other words, when the current inner loop parameter of one unit in the wind farm increases, the dynamic energy generated by the other units affected by the induction effect will also increase, intensifying the system oscillation. On the contrary, if the current inner loop parameters of one unit are reduced, the dynamic energy generated by the other units will gradually decrease due to the is induction effect.

For PLL parameters, $\Delta\eta_{km\_x}$ and $\Delta\eta_{km\_s}$ are mainly determined by the term $A_{pll2}^{km}(A_{pll1}^k A_{pll1}^m + A_{pll2}^k A_{pll2}^m)$ of the coefficient Apll2, and the expression can be written as:

$$A_{pll2}^{km}\big(A_{pll1}^k A_{pll1}^m + A_{pll2}^k A_{pll2}^m\big) =$$

$$\bigg\{K_{p\_PLL}^k \frac{1}{\omega_d}\bigg[(\omega_d - \omega_s)L - \frac{1}{\omega_d - \omega_s}\frac{1}{C}\bigg] - K_{i\_PLL}^k \frac{R}{\omega_d^2}\bigg\} \cdot$$

$$\bigg(K_{p\_pll}^k K_{p\_pll}^m + \frac{K_{i\_pll}^k K_{i\_pll}^m}{\omega_d^2}\bigg)\frac{R^2 + \bigg[(\omega_d - \omega_s)(L + L_t) - \frac{1}{\omega_d - \omega_s}\frac{1}{C}\bigg]^2}{\omega_d^s}$$

It can be seen from the above formula that when the parameters of the phase-locked loop of the kth unit and the mth unit are increased, $A_{pll2}^{km}(A_{pll1}^k A_{pll1}^m + A_{pll2}^k A_{pll2}^m)$ will increase accordingly, but the influence of the parameters of the phase-locked loop of the kth unit is far greater than that of the mth unit. Therefore, the inter machine induction coefficient $\Delta\eta_{km\_s}$ is mainly affected by the parameters of the phase-locked loop of the kth unit. With the increase of the parameters of the phase-locked loop of the kth unit, it will increase, intensifying the negative damping effect of the kth unit on the field network oscillation.

When only the parameter difference of inter machine PLL is considered, $\Delta\eta_{km\_x}=0$, but the current loop parameters are the same, which means the parameter difference of PLL will not cause inter machine oscillation. When the parameters of the inter machine phase-locked loop and the current loop are different, $\Delta\eta_{km\_x}$ is mainly determined by the parameters of the phase-locked loop of the kth unit. The larger the parameters of the phase-locked loop are, the greater $\Delta\eta_{km\_x}$ is, the greater the energy accumulation rate of the inter machine circulation is, and the inter machine oscillation stability is reduced.

Therefore, the operation state parameters of each unit can be adjusted to make the current loop parameters and phase-locked loop parameters of each unit the same, so as to reduce the energy accumulation rate of the unit and the field network.

In the actual process, due to the existence of multiple units, the operating status parameters of each unit have different benchmarks. Taking which unit's operating status parameters as the benchmark is the key to ensure the stable operation of the system. In order to solve the above technical problems, the application introduces the access distance as the basis for determining which unit is used as the benchmark.

The voltage oscillation components at the grid point generated by units with different access distances are different, and the phase-locked angle collected by the phase-locked loop is also different, which affects the interaction energy between units. Therefore, the unit access distance Lt mainly affects $\Delta\eta_{km\_x}$ and $\Delta\eta_{km\_s}$ by changing the value of the phase locking angle coefficient $A_{pll1}{}^k$, $A_{pll2}{}^k$.

Specifically, when unit access distance is different, the coefficients $A_{pll1}{}^k A_{pll1}{}^m + A_{pll2}{}^k A_{pll2}{}^m$ in $\Delta\eta_{km\_x}$ and $\Delta\eta_{km\_s}$ can be expressed as:

$$A_{pll1}^k A_{pll1}^m + A_{pll2}^k A_{pll2}^m = \left(K_{p\_pll}^2 + \frac{K_{i\_pll}^2}{\omega_d^2}\right)\frac{R^2 + L_{eq}^k L_{eq}^m}{\omega_d^2}$$

$$\text{where, } L_{eq}^k = \left[(\omega_d - \omega_s)(L + L_t^k) - \frac{1}{\omega_d - \omega_s}\frac{1}{C}\right]$$

It can be seen from the above formula that the value of $A_{pll1}{}^k A_{pll1}{}^m + A_{pll2}{}^k A_{pll2}{}^m$ decreases with the increase of the access distance of the kth unit or the mth unit since $\omega_d - \omega_s < 0$. Therefore, for the inter machine inductance coefficient $\Delta\eta_{km\_s}$, when the access distance of any unit in the field increases, the induction at the end of the kth unit decreases and $\Delta\eta_{km\_s}$ gradually decreases, that is, the closer the unit to the grid connected bus of the wind farm, the greater the interaction energy between the units, the stronger the is induction effect between the units, and the higher its participation in the sub synchronous oscillation of the field grid.

For the circulation current coefficient $\Delta\eta_{km\_x}$ between units, when there is no difference in the current inner loop parameters between units, there is no circulating current energy between units, that is, the difference in unit access position will not cause inter unit oscillation. When there are differences in the parameters of the internal current loop between units, the value of $\Delta\eta_{km\_x}$ will decrease with the increase of the access distance of the kth unit or the mth unit. At this time, the circulating current energy between units will decrease, and the stability of inter unit oscillation will improve.

In the embodiment of the application, based on the relationship between current loop parameters, phase-locked loop parameters, access distance and $\Delta\eta_{km\_x}$ and $\Delta\eta_{km\_s}$, reducing the current loop parameters and phase-locked loop parameters of the unit with the smallest access distance can most effectively ensure the stable operation of the system. Therefore, first adjust the current loop parameters and phase-locked loop parameters of the unit with the minimum access distance to reduce $\Delta\eta_{km\_s}$, so as to reduce the total inter machine induction coefficient. It should be noted that the current loop parameters and phase-locked loop parameters are calculated from the operation state parameters, so the operation state parameters are adjusted to adjust the current loop parameters and phase-locked loop parameters. Then, $\Delta\eta_{km\_s}$ of other units is reduced in turn until the total inter machine induction coefficient is less than 0 (i.e. the preset value). It should be noted that, according to the is actual situation, $\Delta\eta_{km\_s}$ of each unit changes within a range. Therefore, in actual use, the minimum value of $\Delta\eta_{km\_s}$ of each unit can be reduced at most. If the total inter machine induction coefficient is still not less than 0, it continues to reduce $\Delta\eta_{km\_s}$ of the other unit.

When there is no difference in the current inner loop parameters between the units, the difference in the unit access position will not cause inter unit oscillation. Therefore, the next step is to reduce the difference of current loop parameters of each unit by adjusting the operation state parameters. $\Delta\eta_{km\_s}$ of several units with close access distance have just been adjusted to make the total inter machine induction coefficient less than 0, which is obviously not suitable for further adjustment. Therefore, when reducing the difference of current loop parameters of each unit, the current loop parameters of the unit that has just been adjusted should be taken as the benchmark. When there are differences in the current inner loop parameters between units, the smaller the access distance, the stronger the energy coupling effect between units. Therefore, the adjustment sequence is still the sequence of gradually increasing the access distance, continuously reducing the difference in the current loop parameters between any two adjacent units, until absolute value of the total inter machine circulation current coefficient is less than absolute value of the total inter machine inductance coefficient, so as to avoid inter machine oscillation in the field network system.

It should be noted that the difference of current loop parameters of each unit cannot be guaranteed to be small after adjusting the total inter machine circulation current coefficient to be less than 0. When the difference of current loop parameters of each unit is small enough, the total inter machine circulation current coefficient will be greater than 0. Therefore, in actual use, is adjusting the total inter machine circulation current coefficient and adjusting the difference of the current loop parameters of each unit are two alternating steps until both can reach the preset conditions.

Specifically, the energy coefficient comprises inter machine induction coefficient and inter machine circulation current coefficient, and the total energy coefficient comprises inter machine induction coefficient and inter machine circulation current coefficient. Among them, the total inter machine inductance coefficient is the sum of the inter machine inductance coefficient of each unit, and the total inter machine circulation coefficient is the sum of the inter machine circulation current coefficients of each unit.

S11. obtaining the total inter machine induction coefficient by calculating the sum of the inter machine induction coefficient of each unit;

S12. determining whether the total inter machine induction coefficient is less than a preset value;

If yes, go to step S13; If not, adjusting the operation state parameters of each unit successively in the order of increasing gradually the access distance until the total inter machine induction coefficient is less than the preset value;

S13. obtaining the total inter machine circulation current coefficient by calculating the sum of the inter machine circulation current coefficient of each unit;

S14. determining whether absolute value of the total inter machine circulation current coefficient is less than absolute value of the total inter machine induction coefficient;

If yes, step of adjusting is completed; Otherwise, based on the operation state parameters of a unit with minimum access distance, adjusting the operation state parameters of each unit successively in the order of increasing gradually the access distance until absolute value of the total inter machine circulation current coefficient is less than absolute value of the total inter machine induction coefficient; Return to step S11.

Preferably, the difference between the absolute value of the total inter machine circulation current coefficient and the absolute value of the total inter machine induction coefficient is preset so that the absolute value of the total inter machine circulation current coefficient is far less than the absolute value of the total induction coefficient, further ensuring the stability of the system and reducing the adjustment time.

In the embodiment of the application, it is also possible to reduce the risk of vibration of the system by using only the total inter machine circulation current coefficient or the total inter machine induction coefficient according to the specific situation. Specifically, Calculating the sum of inter machine induction coefficient of each unit to obtain the total inter machine induction coefficient;

Determining whether the total inter machine induction coefficient is less than a preset value;

When the total inter machine induction coefficient is not less than the preset value, the operation state parameters of each unit shall be adjusted in sequence according to the sequence of gradually increasing access distance until the total inter machine induction coefficient is less than the preset value.

Or,

Calculating the sum of inter machine circulation current coefficient of each unit to obtain the total inter machine circulation current coefficient;

Determining whether the absolute value of total inter machine circulation current coefficient is less than the absolute value of total inter machine induction coefficient;

When the absolute value of the total inter machine circulation current coefficient is not less than the absolute value of the total inter machine induction coefficient, the operation state parameters of each unit shall be is adjusted in sequence according to the sequence of increasing the access distance based on the operation state parameters of units with small access distance, until the absolute value of the total inter machine circulation current coefficient is less than the absolute value of the total inter machine induction coefficient.

To sum up, the stability control method of grid connected system of double-fed wind farm provided in this embodiment constructs the energy interaction coefficient model of double-fed wind farm taking into account the difference between units, and analyzes the interaction between units in wind farms based on this model. Compared with the traditional analysis method, the invention can accurately quantify the coupling degree between units, evaluate the damping effect of inter machine interaction on inter machine oscillation mode and field network oscillation mode, and accurately characterize the physical process of inter machine interaction inducing system oscillation divergence. The damping level of the grid connected system of the double-fed wind farm is improved and the operation stability and security of the power grid are guaranteed by adjusting the parameters of the phase-locked loop and the current loop in a targeted manner, taking into account the stability of the two oscillation modes, namely, i inter machine oscillation and field network oscillation.

The embodiment of the application provides a stability control system for grid connected system of double-fed wind farm, including: acquisition module, data processing module and control module;

The acquisition module is configured to acquire the operation state parameters of each unit in the system;

The data processing module is configured to determine the mutual voltage between the units, the interlocking phase angle between the units, and the sub-synchronous current component of each unit according to the operation state parameters of the unit; determine the energy coefficient of each unit according to the mutual voltage between the units, the interlocking phase angle between the units and the sub synchronous current component of each unit;

The control module is configured to adjust and control the operation state parameters of each unit according to the energy coefficient of each unit.

Figure 2:
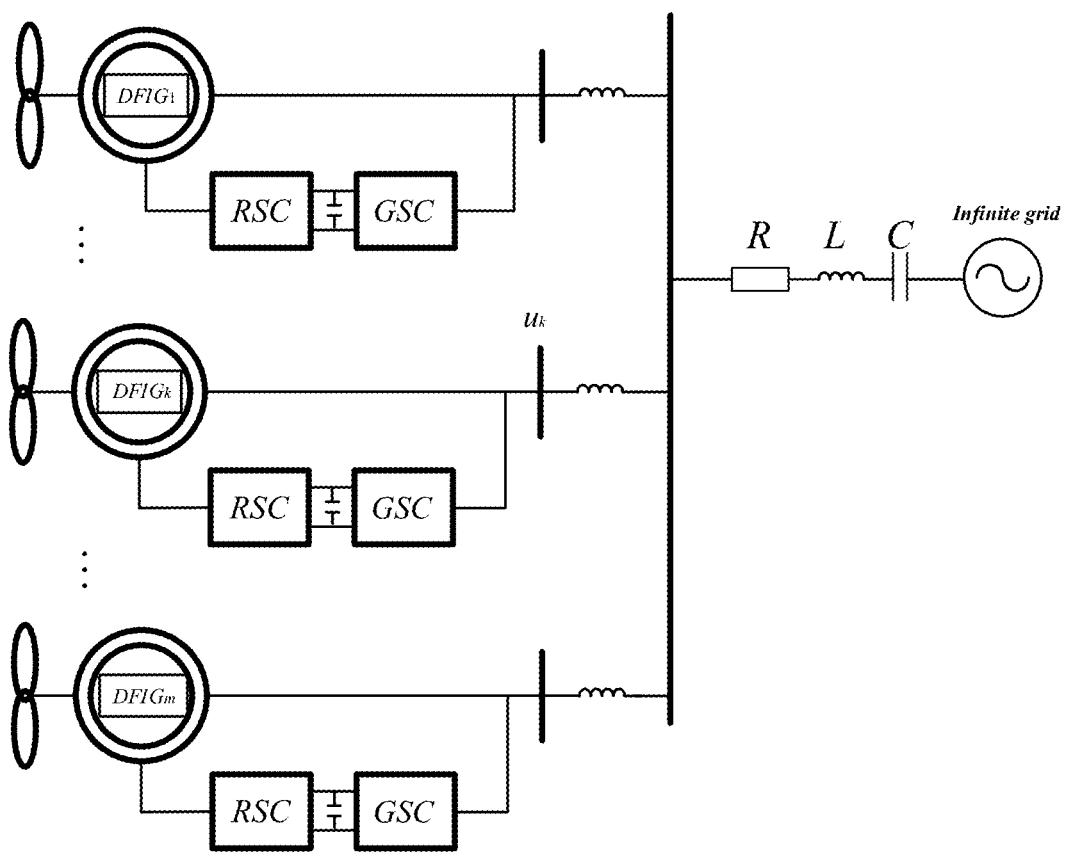
FIG. 2 shows the three turbine wind farm system in the embodiment.

In order to illustrate the feasibility of the above embodiments, the present application provides the following embodiments:

Take the three turbine wind farm simulation model as an example, as shown in FIG. 2, and the wind farm parameter settings are shown in Table 1.

TABLE 2

Basic parameters of grid connected system of double-fed wind farm

| Parameter | Symbol | Numerical Value | Parameter | Symbol | Numerical Value |
| --- | --- | --- | --- | --- | --- |
| Rated power | Pm | 1.5 MW | Rotor resistance | Rr | 0.05631 pu |
| Rated frequency | f | 50 Hz | Stator leakage inductance | Ls | 0.1 pu |
| Rated voltage of stator | Us | 0.69 kV | Rotor leakage inductance | Lr | 0.03129 pu |
| Stator resistance | Rs | 0 pu | Mutual inductance | Lm | 0.13129 pu |
| Series compensation capacitor | C | 0.0009 F | Line inductance | L | 0.057 H |

Run the energy interaction coefficient analysis module, and the operation result is:

(1) Different Current Loop Parameters

Figure 3A:
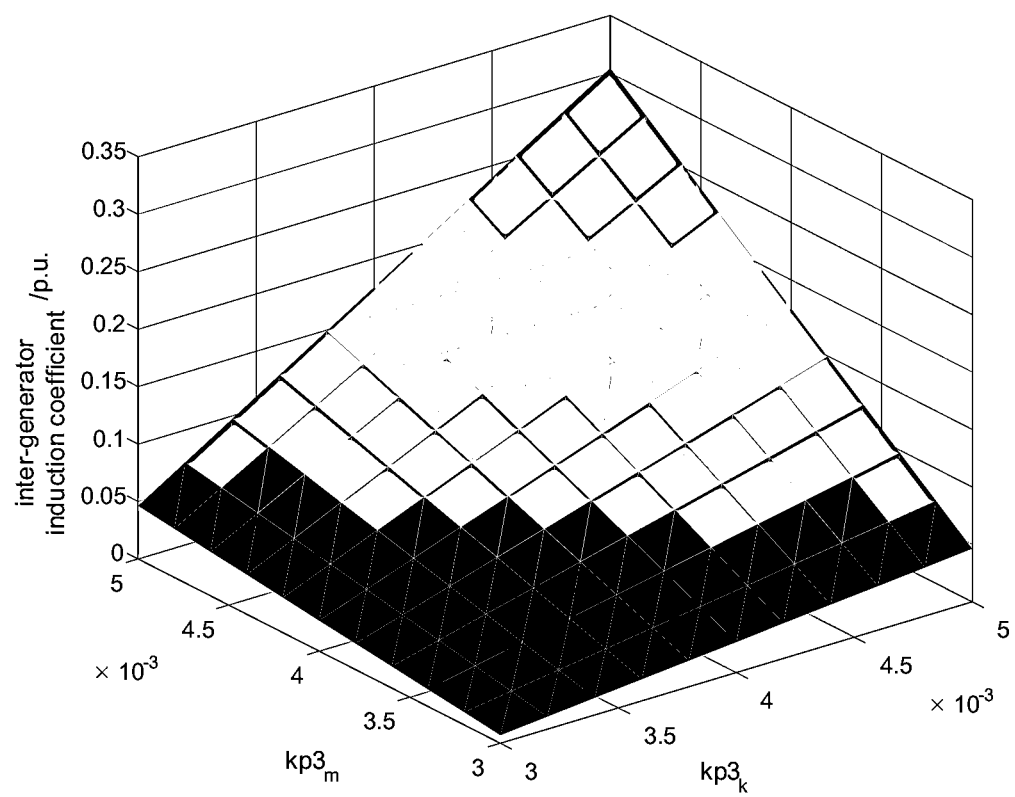
FIG. 3a shows the variation of the inter machine induction with the current loop parameters in the embodiment.
Figure 3B:
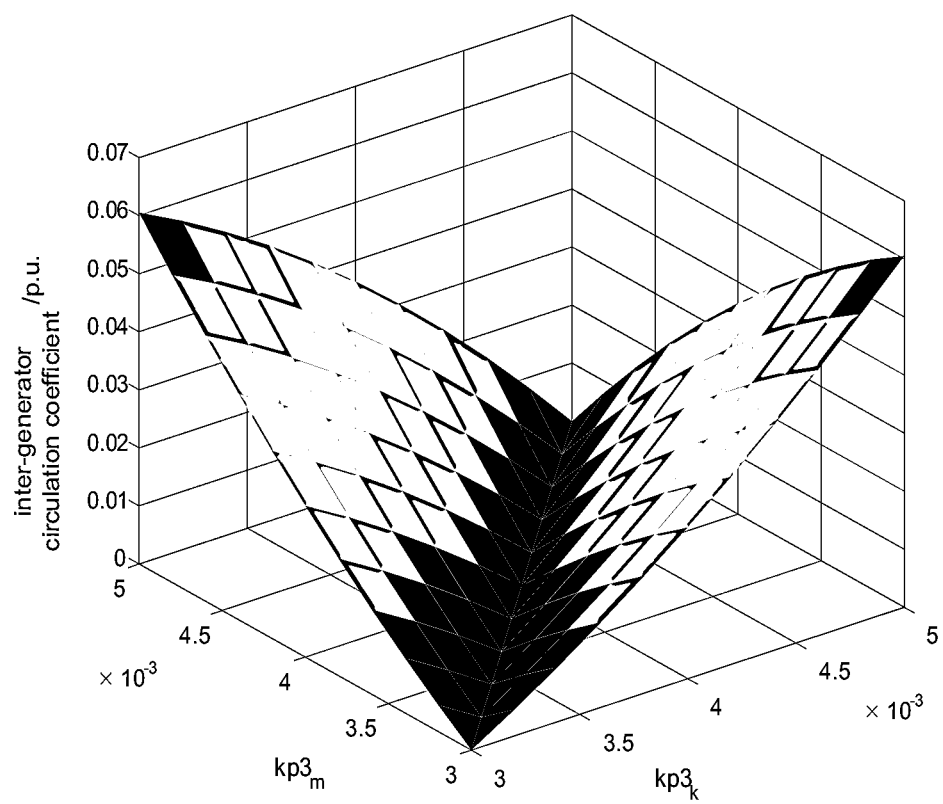
FIG. 3b shows the change of the circulation current coefficient between generators with the current loop parameters in the embodiment.

The changes of inter machine induction coefficient and inter machine circulation current coefficient of DFIG-kth (the kth unit) port with the Kp parameter of the current inner loop are shown in FIGS. 3a and 3b. It can be seen from FIG. 3a that in addition to its own machine network interaction energy, DFIG-kth port also has the dynamic energy induced by other units at their machine ends, and the inter machine induction coefficient is always positive. With the increase of Kp parameters of other units, the inter machine induction energy increases, and the negative damping contribution of DFIG-kth to field network oscillation increases.

The inter machine circulation current coefficient under different Kp parameters is shown in FIG. 3b. When the parameters of DFIG-kth and DFIG-mth (the mth unit) are equal, the inter machine circulation current coefficient is always 0. When there is a difference between the two parameters, the inter machine circulation current coefficient increases gradually with the increase of the parameter difference. At this time, the circulation energy accumulation rate caused by inter machine oscillation is accelerated, and the system stability is reduced.

In order to verify the accuracy of the above analysis, the invention unifies the parameters of the three units, and depicts the changes of the port current oscillation components of the three units in the wind farm with the DFIG1 parameters through semi physical simulation. Specific parameters are set as Lt=1p.u., v=0.9p.u., $K_{p3}^1$=0.005, 0.004, 0.003p.u. Kp_pll=0.5p.u., $K_{p3}^2$=$K_{p3}^3$=0.005 p.u. Input the series compensation line to excite the sub-synchronous oscillation in 1.5 s, and the simulation analysis results under different parameters are shown in FIGS. 4a-4f. Because $K_{p3}$ of DFIG2 and DFIG3 are the same, their curves are coincident, so only two curves are shown in the figures.

Figure 4A:
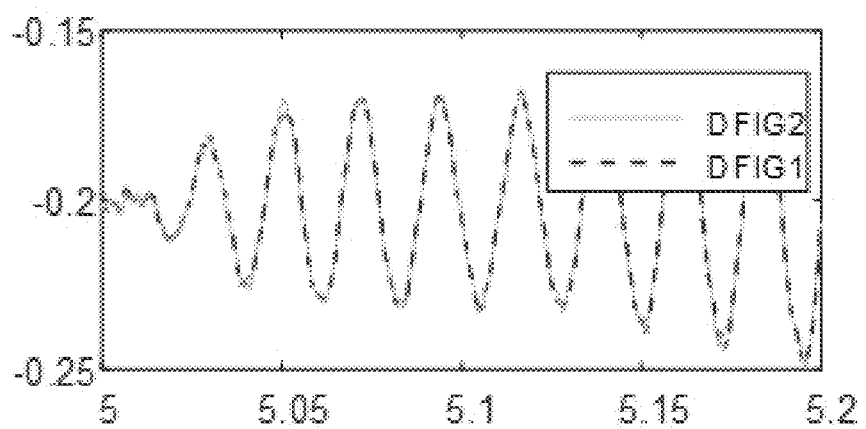
FIGS. 4a-4f show the changes of DFIG1 port current and frequency spectrum of each unit under different current loop parameters in the embodiment.
Figure 4B:
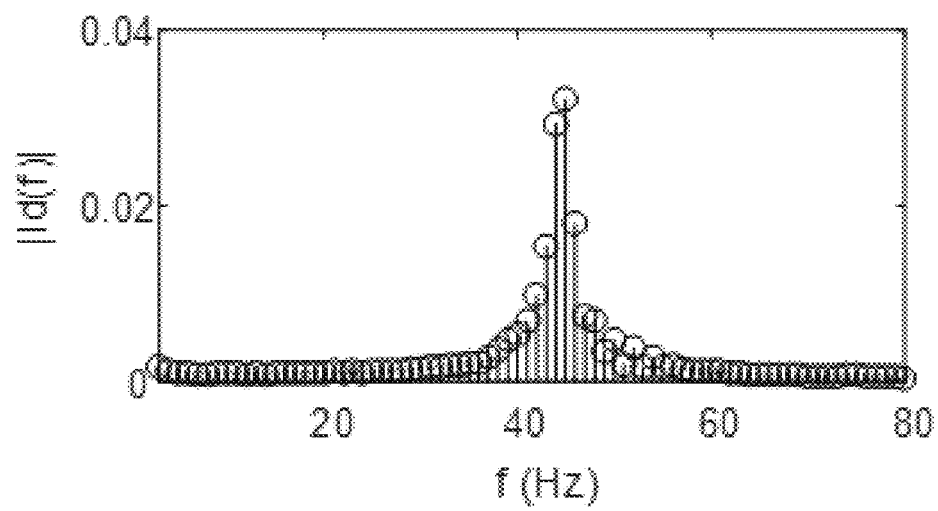
Figure 4C:
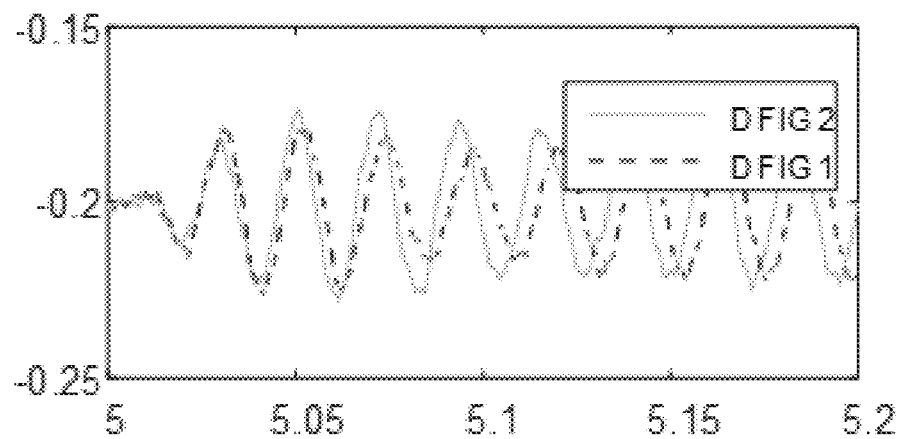
Figure 4D:
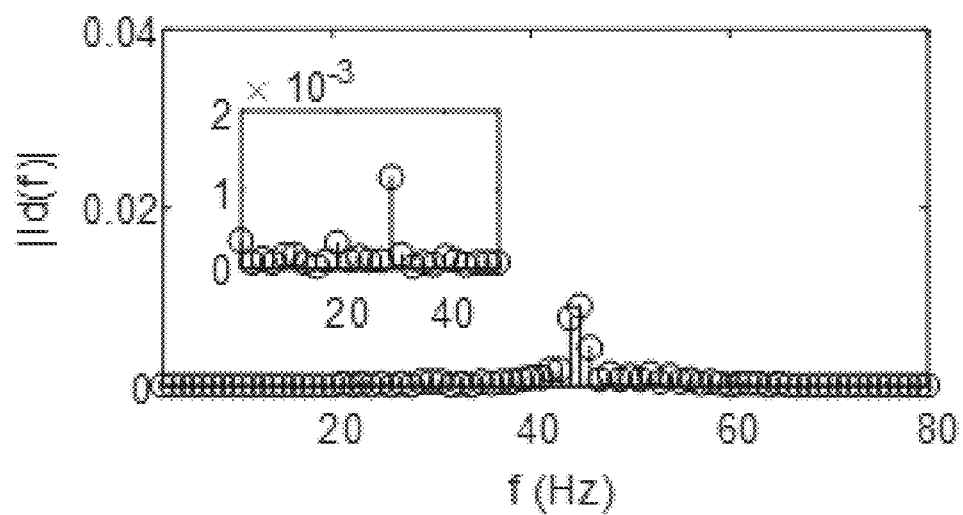
Figure 4E:
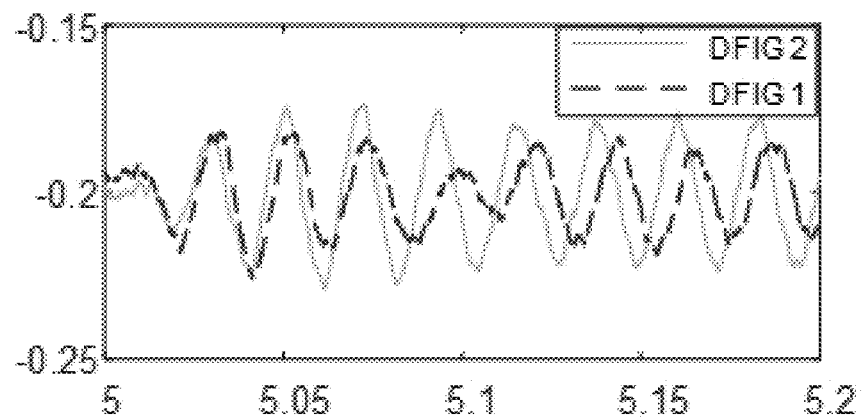
Figure 4F:
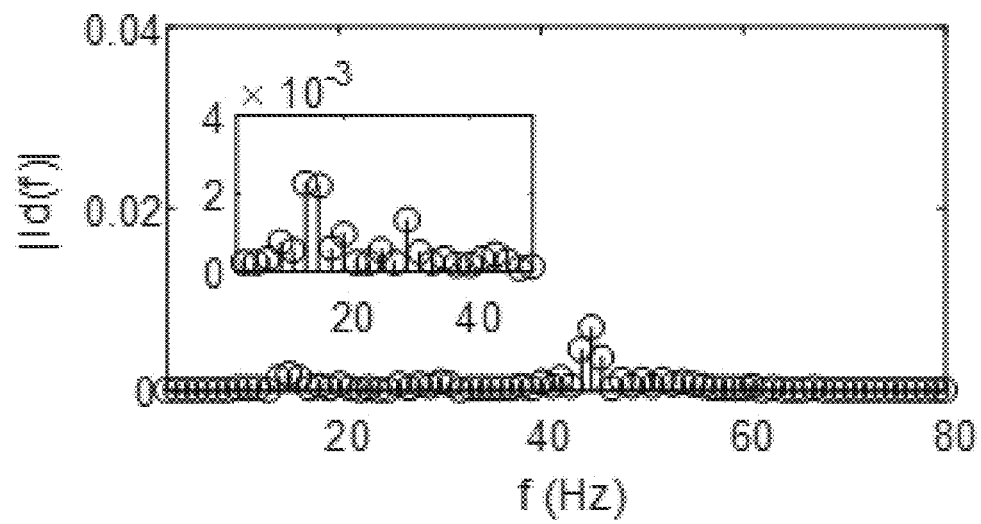

It can be seen from FIG. 4a and FIG. 4b that when the parameters of DFIG1, DFIG2 and DFIG3 are the same, 6 Hz (d-q axis is 44 Hz) sub-synchronous oscillation will be excited after the system is put into series compensation line, and the system will gradually diverge to instability. At this time, the oscillation current at each unit terminal is the same. When the $K_{p3}$ parameter of DFIG1 decreases to 0.004, the system oscillation changes from divergence to convergence. It can be seen from FIG. 4c that DFIG2 and DFIG3 are affected by the induction effect, and their oscillation amplitudes gradually decrease with the decrease of DFIG1 parameter, and also show convergence. When the current loop $K_{p3}$ parameter of DFIG1 is further reduced, the oscillation amplitude of the three units decreases significantly, but at this time, in addition to the original sub-synchronous oscillation, the inter machine oscillation mode is also excited in the system. Compared with FIG. 4b, FIG. 4d and FIG. 4f, it can be seen that when the parameter difference between DFIG1 and DFIG2, 3 is greater, the inter machine oscillation mode is more obvious, and its stability is worse.

(2) Different PLL Parameters

Figure 5A:
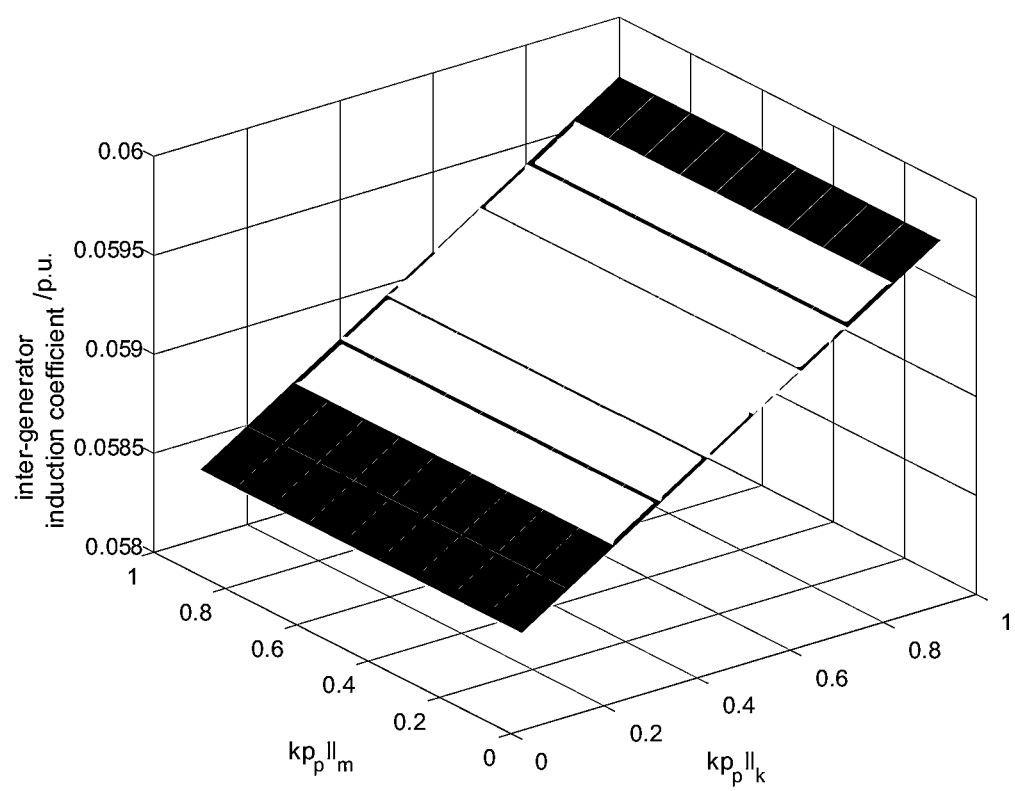
FIG. 5a shows the change of inter machine induction with PLL parameters in the embodiment.
Figure 5B:
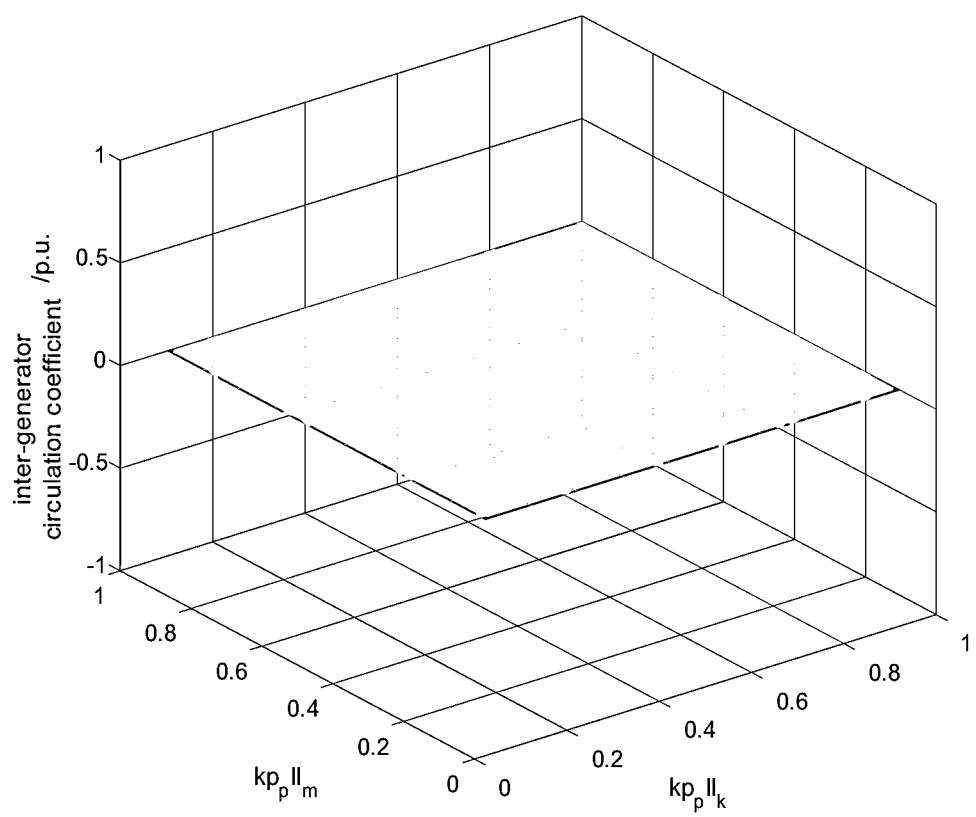
FIG. 5b shows the change of the circulation current coefficient between generators with the parameters of the phase-locked loop in the embodiment.

The inter machine induction coefficient and inter machine circulation current coefficient of DFIG-kth port under different PLL parameters are shown in FIGS. 5a and 5b. Wherein, FIG. 5a depicts the change of inter machine induction coefficient. It can be seen from the figure that the inter machine induction coefficient of DFIG-kth increases with the increase of $K_{p\_pll}^k$, and the inter machine induction effect also increases. $K_{p\_pll}^m$ increases, although $\eta_{mk\_s}$ will also increase, but its changes are far less than $K_{p\_pll}$. FIG. 5b depicts the change of inter machine circulation current coefficient when there are only PLL parameter differences between units. It can be seen from the figure that when the current inner loop parameters between units are the same, the difference of PLL parameters will not cause inter machine circulating current.

In order to verify the accuracy of the above analysis, the invention describes the changes of the port oscillation components of the three units in the wind farm with the DFIG1 phase-locked loop Kp parameters through semi physical simulation. The parameter is set to $K_{p3}^1$=$K_{p3}^2$=$K_{p3}^3$=0.005p.u., v=0.9p.u., $K_{p\_pll}^1$=0.2, 0.5, 1, $K_{p\_pll}^2$=$K_{p\_pll}^3$=0.5p.u., Lt=1p.u. The simulation results under different parameters are shown in FIG. 6.

Figure 6:
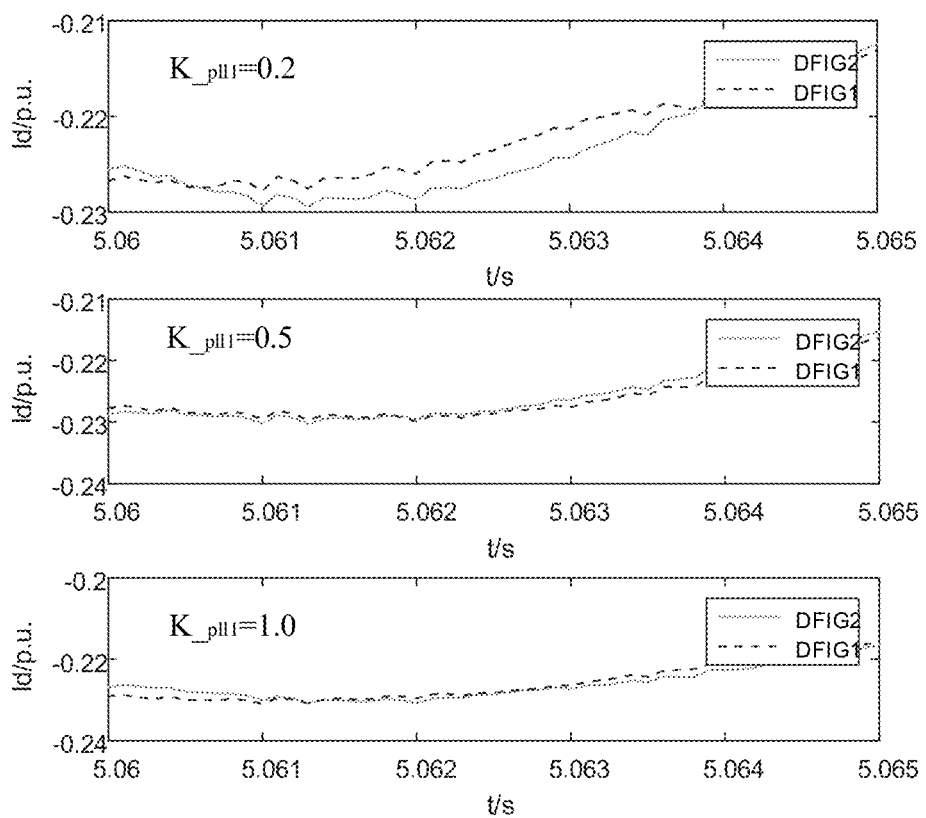
FIG. 6 shows the simulation results under different $K_{p\_pll1}$ conditions in the embodiment.

It can be seen from FIG. 6 that when the parameter Kp of DFIG1 phase-locked loop increases from 0.2 to 0.5, the oscillating current component of DFIG1 gradually increases. When the parameters of three units are equal, the oscillating current amplitudes of three units are the same. As the phase locked loop Kp parameter of DFIG1 further increases to 1p.u., the oscillating current component of DFIG1 also increases, exceeding that of DFIG2 and DFIG3. In addition, by comparing the 4.9-5 s oscillation curve, it can be seen that changing the PLL parameters will not affect the inter machine oscillation stability. Because DFIG2 and DFIG3 have the same $K_{p\_pll}$, their curves are coincident, so only two curves are shown in the figure.

(3) Different Access Distances

Figure 7A:
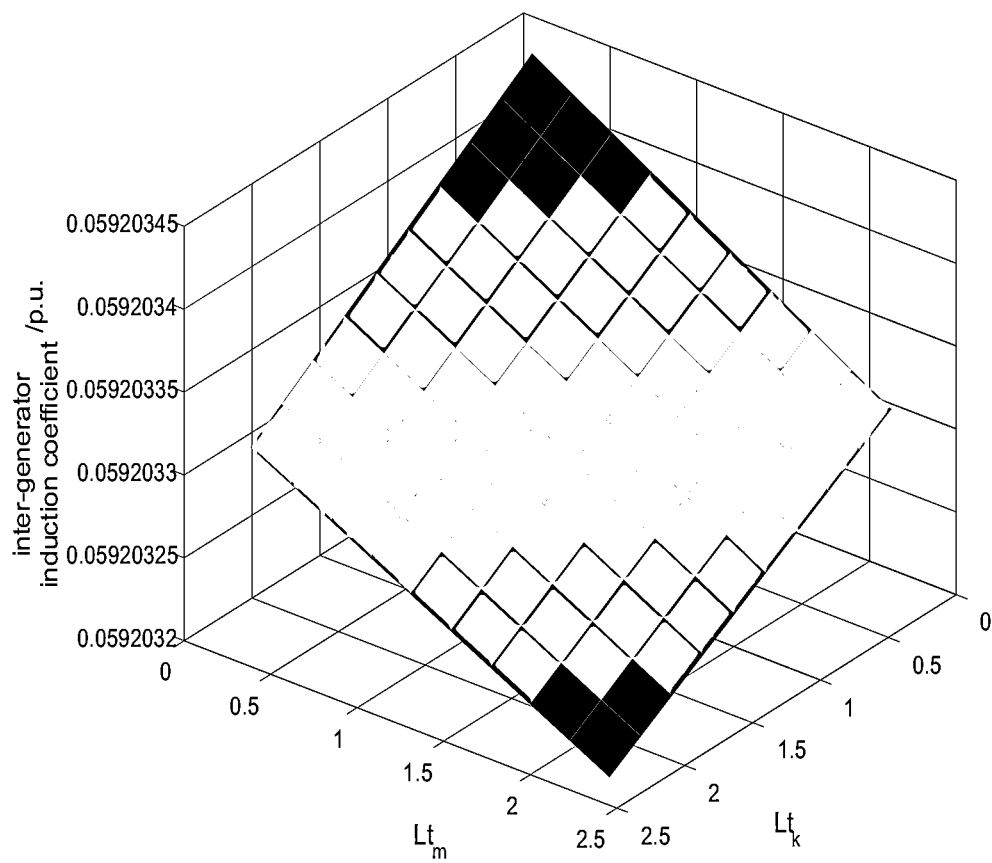
FIG. 7a shows the change of inter machine induction coefficient under different access distances in the embodiment.
Figure 7B:
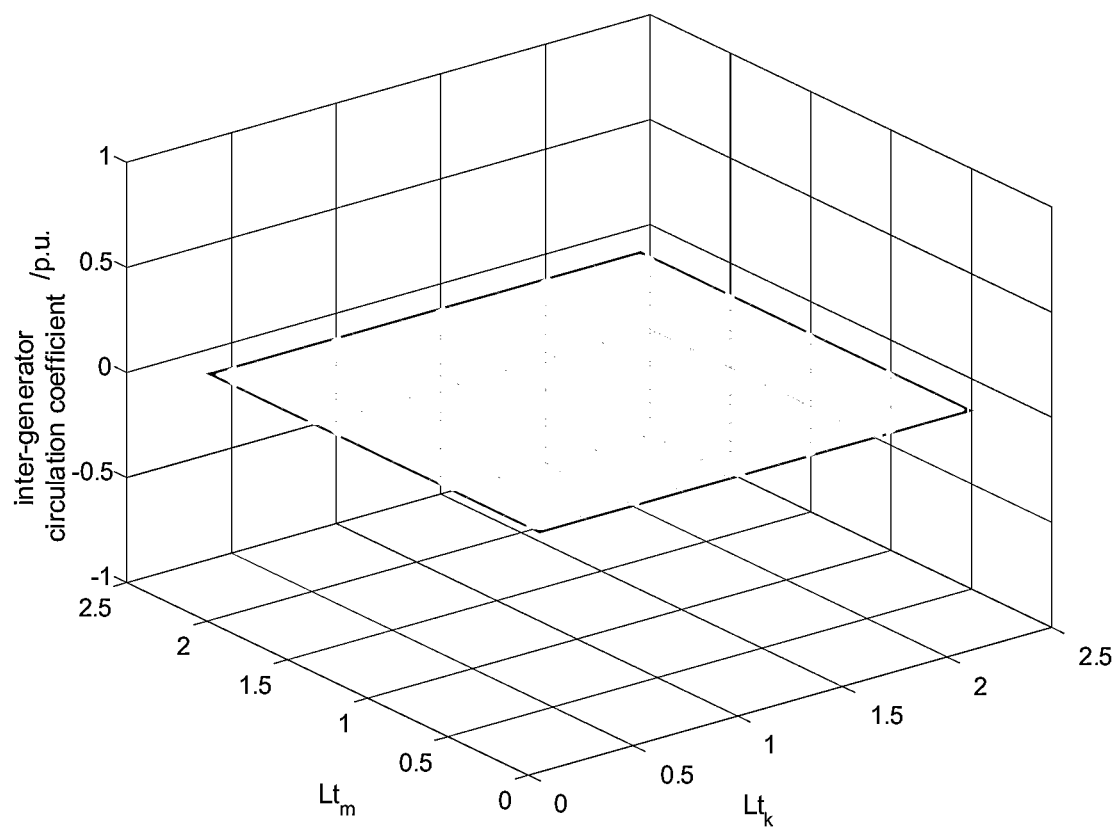
FIG. 7b shows the change of the inter machine circulation current coefficient under different access distances in the embodiment.

The inter machine induction coefficient and inter machine circulation current coefficient under different access distances are shown in FIGS. 7a and 7b. It can be seen from FIG. 7a that the increase in the access distance of any unit in the field will reduce the inter machine induction effect, reduce the cumulative rate of inter machine induction energy generated by DFIG-kth port, and improve the stability of field network oscillation. In other words, the farther the units are connected, the lower the inter machine induction effect will be, and the smaller the negative damping contribution to the field network oscillation will be.

FIG. 7b depicts the change of the inter machine circulation current coefficient at different access distances. It can be seen from the figure that the difference of the inter machine access distances will not cause the inter machine circulating current and will not affect the stability of the inter machine oscillation.

In order to verify the accuracy of the above analysis, the invention describes the changes of the port oscillation components of the three units in the wind farm with the DFIG1 access distance through semi physical simulation. The parameter is set to:

v=0.9p.u., Kp_pll=0.5p.u., $K_{p3}^1$=$K_{p3}^2$=$K_{p3}^3$=0.005p.u. $L_t^1$=0.5, 1, 1.5p.u., $L_t^2$=$L_t^3$=1p.u.

The simulation results under different access distances are shown in FIGS. 8a-8d. Since the access distances of DFIG2 and DFIG3 are the same, their curves are coincident, so only two curves are shown in the figure.

Figure 8A:
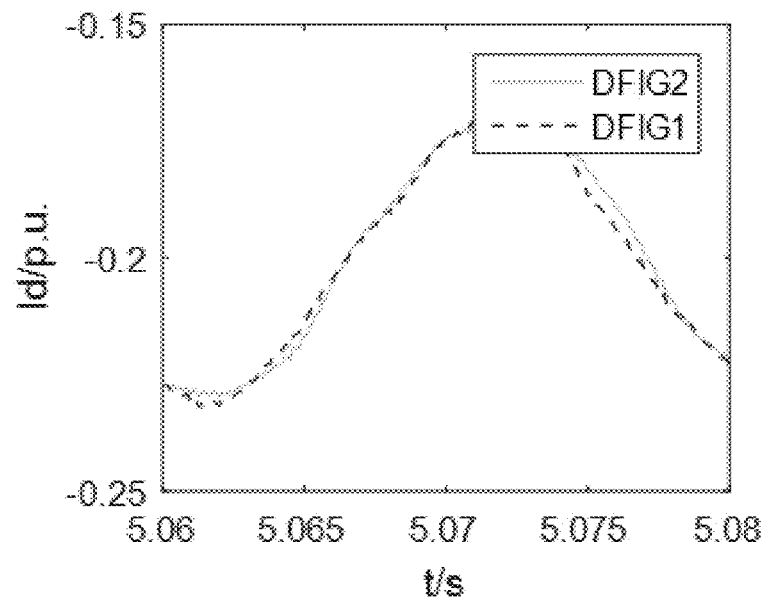
FIGS. 8a-8d show the simulation results under different access distances in the embodiment.
Figure 8B:
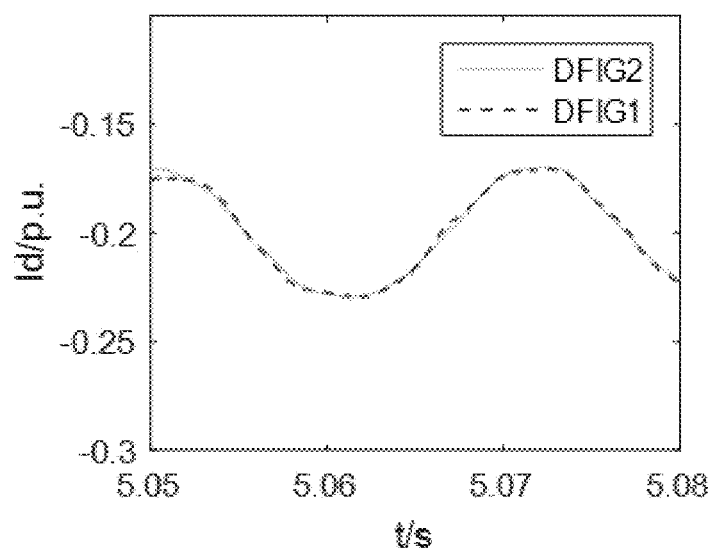
Figure 8C:
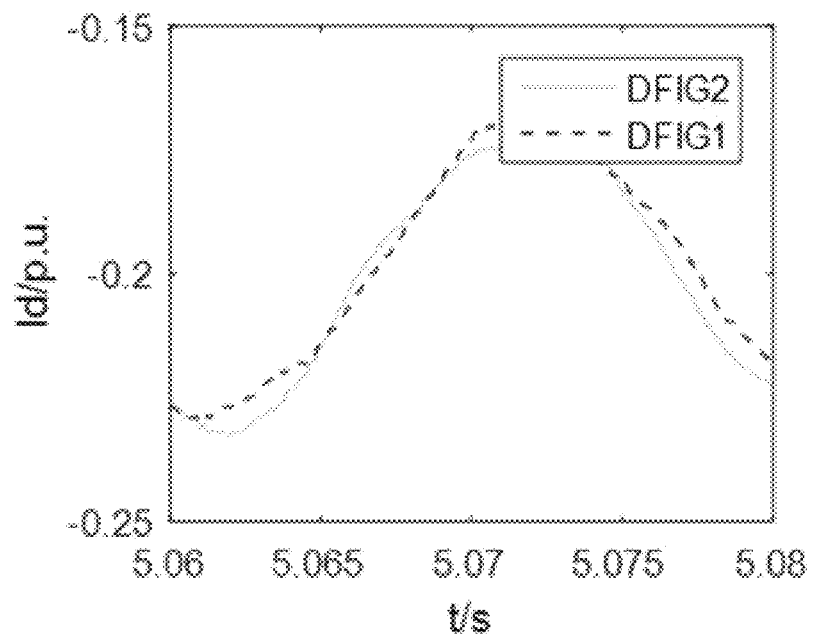
Figure 8D:
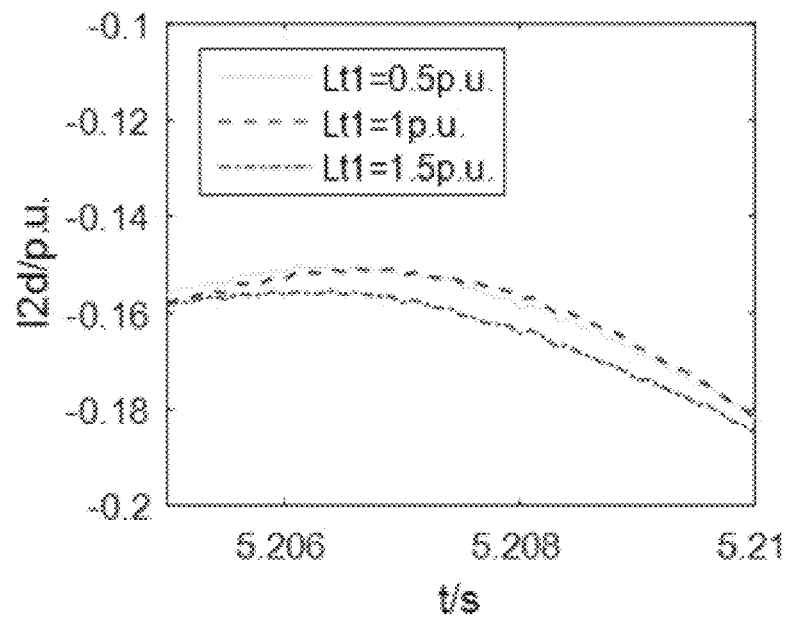

When DFIG1 access distance is less than DFIG2 and DFIG3, it can be seen from FIG. 8a that DFIG1 oscillation amplitude is slightly greater than DFIG2 and DFIG3. When DFIG1 access distance increases to the same as DFIG2 and DFIG3, it can be seen from FIG. 8b that the amplitude and divergence trend of the oscillation current of the three units are the same. When the access distance of DFIG1 further increases, it can be seen from FIG. 8c that the amplitude of DFIG1 oscillation gradually decreases, that is, the contribution of units with long access distance to the field network oscillation is low. FIG. 8d depicts the change trend of DFIG2 terminal current when DFIG1 access distance changes. It can be seen from the figure that when the connection position of DFIG1 increases, the inter machine induction effect decreases, and the oscillating current of DFIG2 also decreases. In addition, by comparing FIG. 8b and FIG. 8c, it can be seen that only changing the unit access distance will not trigger inter machine oscillation.

Run the parameter adjustment module, and the operation result is:

The control parameter settings before and after adjustment are shown in Table 2 and Table 3.

TABLE 2

Wind farm parameter settings before optimization

| | $K_p$ | $K_{p\_pll}$ | L | $\eta_{mk\_s}$ | $\eta_{mk\_x}$ |
|---|---|---|---|---|---|
| DFIG1 | 0.0032 | 1.5 | 1 | | |
| DFIG2 | 0.0040 | 0.8 | 0.5 | 1.168 | 0.03 |
| DFIG3 | 0.0042 | 0.6 | 1.2 | | |

TABLE 3

Wind farm parameter settings after optimization

| | $K_p$ | $K_{p\_pll}$ | L | $\eta_{mk\_s}$ | $\eta_{mk\_x}$ |
|---|---|---|---|---|---|
| DFIG1 | 0.0028 | 1.417 | 1 | | |
| DFIG2 | 0.0036 | 0.66 | 0.5 | 0.306 | 0.101 |
| DFIG3 | 0.0040 | 0.30 | 1.2 | | |

Figure 9:
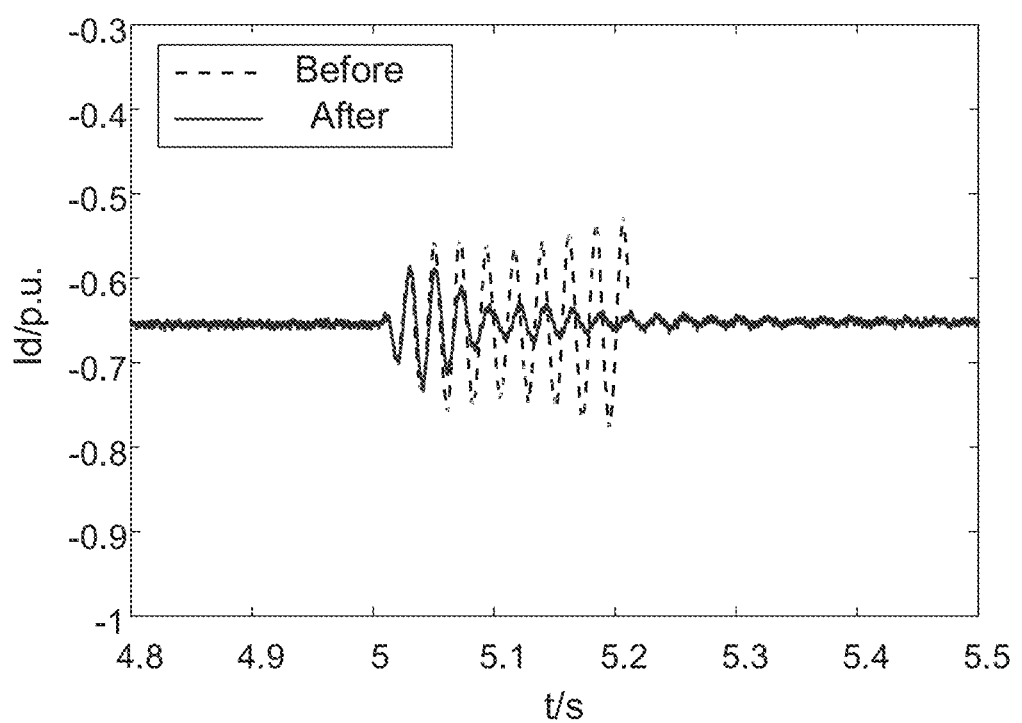
FIG. 9 shows the system oscillation curve before and after parameter optimization in the embodiment.

In order to verify the accuracy of the results, semi physical simulation was carried out for these two groups of parameters. The oscillation curve of the wind farm port is shown in FIG. 9. It can be seen from FIG. 9 that before parameter optimization, series compensation lines are introduced into the system at 5 s, and sub-synchronous oscillation is excited at the wind farm port, and the oscillation is gradually divergent and unstable. After parameter optimization, the system sub-synchronous oscillation changes from divergence to convergence, and the system stability is improved.

The above description is only a preferred specific embodiment of the application, but the scope of protection of the application is not limited to this. Any change or replacement that can easily be thought of by any skilled person familiar with the technical field within the technical scope disclosed in the application should be covered in the scope of protection of the application.

What is claimed is:

1. A stability control method for grid connected system of double-fed wind farm, comprising:
   collecting operation state parameters of each of wind turbine generator units in the system;
   determining a mutual voltage between the units, an interlocking phase angle between the units, and a sub-synchronous current component of each unit according to the operation state parameters of each unit;
   determining an energy coefficient of each unit, and then obtaining a total energy coefficient according to the mutual voltage between the units, the interlocking phase angle between the units and the sub-synchronous current component of each unit;
   adjusting the operation state parameters of each unit according to the total energy coefficient.

2. The method according to claim 1, further comprising:
   collecting an access distance of each unit;
   wherein adjusting the operation state parameters of each unit according to the total energy coefficient, comprises:
   adjusting the operation state parameters of each unit successively in the order of increasing gradually the access distance according to the total energy coefficient.

3. The method according to claim 2, wherein,
   the total energy coefficient comprises: total inter machine induction coefficient and total inter machine circulation current coefficient;
   the total inter machine induction coefficient refers to the sum of inter machine induction coefficient of each unit; the total inter machine circulation current coefficient refers to the sum of the inter machine circulation current coefficient of each unit;
   wherein adjusting the operation state parameters of each unit successively in the order of increasing gradually the access distance according to the total energy coefficient, comprises:
   S11. obtaining the total inter machine induction coefficient by calculating the sum of the inter machine induction coefficient of each unit;
   S12. determining whether the total inter machine induction coefficient is less than a preset value;
   if yes, go to step S13; if not, adjusting the operation state parameters of each unit successively in the order of increasing gradually the access distance until the total inter machine induction coefficient is less than the preset value;
   S13. obtaining the total inter machine circulation current coefficient by calculating the sum of the inter machine circulation current coefficient of each unit;
   S14. determining whether absolute value of the total inter machine circulation current coefficient is less than absolute value of the total inter machine induction coefficient;
   if yes, the step of adjusting is completed; otherwise, based on the operation state parameters of a unit with minimum access distance, adjusting the operation state parameters of each unit successively in the order of increasing gradually the access distance until absolute value of the total inter machine circulation current coefficient is less than absolute value of the total inter machine induction coefficient; return to step S11.

4. The method according to claim 2, wherein,
   the total energy coefficient comprises: total inter machine induction coefficient and total inter machine circulation current coefficient;
   the total inter machine induction coefficient refers to the sum of inter machine induction coefficient of each unit; the total inter machine circulation current coefficient refers to the sum of the inter machine circulation current coefficient of each unit;
   wherein adjusting the operation state parameters of each unit successively in the order of increasing gradually the access distance according to the total energy coefficient, comprises:
   obtaining the total inter machine induction coefficient by calculating the sum of the inter machine induction coefficient of each unit;
   determining whether the total inter machine induction coefficient is less than a preset value;
   if not, adjusting the operation state parameters of each unit successively in the order of increasing gradually the access distance until the total inter machine induction coefficient is less than the preset value;

Or,
obtaining the total inter machine circulation current coefficient by calculating the sum of the inter machine circulation current coefficient of each unit;
obtaining the total inter machine induction coefficient by calculating the sum of the inter machine induction coefficient of each unit;
determining whether absolute value of the total inter machine circulation current coefficient is less than absolute value of the total inter machine induction coefficient;
if not, based on the operation state parameters of a unit with minimum access distance, adjusting the operation state parameters of each unit successively in the order of increasing gradually the access distance until absolute value of the total inter machine circulation current coefficient is less than absolute value of the total inter machine induction coefficient.

5. The method according to claim 1, wherein, the operation state parameters comprise: d-axis and q-axis components of rotor voltage, d-axis and q-axis components of rotor current, synchronous speed, rotor speed, stator equivalent self inductance under d-q axis system, rotor equivalent self inductance under d-q axis system, stator and rotor equivalent mutual inductance under d-q axis system, rotor resistance, proportional gain coefficient of current inner loop control, integral gain coefficient of current inner loop control, proportional gain coefficient of current outer loop control, integral gain coefficient of current outer loop control, and one or more of transmission line resistance, transmission line equivalent reactance and series compensated line capacitance.

6. The method according to claim 1, wherein,
is the mutual voltage between the units comprises: d-axis component and q-axis component;
the d-axis component and q-axis component of mutual voltage between the units are:

$$\begin{cases} \Delta u_{dkm} = \sum_{m=1, m \neq k}^{N} R\Delta i_{dm} + L\frac{d\Delta i_{dm}}{dt} - \omega_s L \Delta i_{qm} - \frac{1}{(\omega_d - \omega_s)C}\Delta i_{qm} \\ \Delta u_{qkm} = \sum_{m=1, m \neq k}^{N} R\Delta i_{qm} + L\frac{d\Delta i_{qm}}{dt} + \omega_s L \Delta i_{dm} + \frac{1}{(\omega_d - \omega_s)C}\Delta i_{dm} \end{cases}$$

where, $\Delta u_{dkm}$ is the d-axis component of the mutual voltage between the $k_{th}$ unit and the $m_{th}$ unit, $\Delta u_{qkm}$ is the q-axis component of the mutual voltage between the $k_{th}$ unit and the $m_{th}$ unit, R is the transmission line resistance, $\Delta i_{dm}$ is the d-axis component of the sub-synchronous current of the $m_{th}$ unit, $\Delta i_{qm}$ is the q-axis component of the sub-synchronous current of the $m_{th}$ unit, and L is the transmission line equivalent reactance; $\omega_d = \omega_s - \omega_n$, $\omega_s$ is the synchronous speed, $\omega_n$ is the sub-synchronous oscillation frequency, C is the series compensated line capacitance.

7. The method according to claim 1, wherein,
the sub-synchronous current of each unit comprises: d-axis component and q-axis component;
the d-axis component and q-axis component of the sub-synchronous current of each unit are:

$$\begin{bmatrix} \Delta i_{dk} \\ \Delta i_{qk} \end{bmatrix} = \begin{bmatrix} H_1^k & H_2^k \\ -H_2^k & H_1^k \end{bmatrix}^{-1} \begin{bmatrix} G_1^k & G_2^k \\ -G_2^k & G_1^k \end{bmatrix} \begin{bmatrix} 1 & \Delta\theta \\ -\Delta\theta & 1 \end{bmatrix} \begin{bmatrix} \Delta i_{dkv} \\ \Delta i_{qkv} \end{bmatrix}$$
$$= \begin{bmatrix} M_1^k & M_2^k \\ -M_2^k & M_1^k \end{bmatrix} \begin{bmatrix} 1 & \Delta\theta \\ -\Delta\theta & 1 \end{bmatrix} \begin{bmatrix} \Delta i_{qkv} \\ \Delta i_{qkv} \end{bmatrix}$$

$$\begin{cases} H_1^k = R_r + a_2 s \\ H_2^k = -\frac{L_r L_s - L_m^2}{L_s}\omega_2 \\ a_2 = L_r - L_m^2/L_s \end{cases}$$

$$\begin{cases} G_1^k = \left(K_{p3}^k + \frac{K_{i3}^k}{s}\right)\left[-\left(K_{p1}^k + \frac{K_{i1}^k}{s}\right)\frac{L_m}{L_s}U_s - 1\right] \\ G_2^k = -\omega_2 L_r \end{cases}$$

$$\begin{cases} M_1^k = \frac{H_1^k G_1^k + H_2^k G_2^k}{H_1^{k2} + H_2^{k2}} \\ M_2^k = \frac{H_1^k G_2^k - H_2^k G_1^k}{H_1^{k2} + H_2^{k2}} \end{cases}$$

where, $\Delta i_{dk}$ is the d-axis component of the sub-synchronous current of the $k_{th}$ unit, $\Delta i_{qk}$ is the q-axis component of sub-synchronous current of the $k_{th}$ unit, $\Delta i_{dkv}$ is the d-axis component of the sub-synchronous current of the $k_{th}$ unit under the full tracking state of the phase-locked loop, $\Delta i_{qkv}$ is the q-axis component of the sub-synchronization current of the $k_{th}$ unit under the full tracking state of the phase-locked loop, $K_{p3}^k$ is the proportional gain coefficient of current inner loop control of the $k_{th}$ unit, $K_{i3}^k$ is the integral gain coefficient of current inner loop control of the $k_{th}$ unit, $K_{p1}^k$ is the proportional gain coefficient of current outer loop control of the $k_{th}$ unit, $K_{i1}^k$ is the integral gain coefficient of current outer loop control of the $k_{th}$ unit, $L_s$ is the stator equivalent self inductance under the d-q axis system, $L_r$ is the rotor equivalent self inductance under the d-q axis system, $L_m$ is the stator and rotor equivalent mutual inductance under the d-q axis system, s is the frequency domain operator, and $R_r$ is the rotor resistance, $\Delta\theta$ is the phase-locked angle.

8. The method according to claim 1, wherein,
the interlocking phase angle between the units is:

$$\Delta\theta_{km} = A_{pll1}^{km}\Delta i_{dm} + A_{pll2}^{km}\Delta i_{qm}$$

$$\begin{cases} A_{pll1}^{km} = -K_{p\_PLL}^k R\frac{1}{\omega_d} - K_{i\_PLL}^k \frac{1}{\omega_d^2}\left[(\omega_d - \omega_s)L - \frac{1}{\omega_d - \omega_s}\frac{1}{C}\right] \\ A_{pll2}^{km} = K_{p\_PLL}^k \frac{1}{\omega_d}\left[(\omega_d - \omega_s)L - \frac{1}{\omega_d - \omega_s}\frac{1}{C}\right] - K_{i\_PLL}^k \frac{R}{\omega_d^2} \end{cases}$$

where, $\Delta\theta_{km}$ is the interlocking phase angle between the $k_{th}$ unit and the $m_{th}$ unit, $\Delta i_{qm}$ is the q-axis component of the sub-synchronous current of the $m_{th}$ unit, $K_{p\_PLL}^k$ is the proportional gain coefficient of the phase-locked loop of the $k_{th}$ unit, $K_{i\_PLL}^k$ is the integral gain coefficient of the phase-locked loop of the $k_{th}$ unit, and R is the transmission line resistance, $\Delta i_{dm}$ is the d-axis component of the sub-synchronous current of the $m_{th}$ unit, $\Delta i_{qm}$ is the q-axis component of the sub-synchronous current of the $m_{th}$ unit, and L is the transmission line equivalent reactance; $\omega_d = \omega_s - \omega_n$, $\omega_s$ is the synchronous speed, $\omega_n$ is the sub-synchronous oscillation frequency, C is the series compensated line capacitance.

9. The method according to claim 1, wherein,
determining an energy coefficient of each unit according to the mutual voltage between the units, the interlocking phase angle between the units and the sub-synchronous current component of each unit, comprises:
determining the aperiodic component of the real-time dynamic energy between the units according to the mutual voltage between the units, the interlocking phase angle between the units and the sub-synchronous current component of each unit;
obtaining the energy coefficient through derivativing of the aperiodic component;
the aperiodic components are:

$$\Delta W_{km} = \int_{t}^{t+\frac{2\pi}{\omega}} \Delta P_{ek} d\Delta\theta_{km} + \int_{t}^{t+\frac{2\pi}{\omega}} \Delta i_{dk} d\Delta u_{qkm} - \int_{t}^{t+\frac{2\pi}{\omega}} \Delta i_{qk} d\Delta u_{dkm};$$

Where, $\Delta P_{ek}$ is the active power of the $k_{th}$ double-fed unit, $\Delta u_{dkm}$ is the d-axis component of the mutual voltage between the $k_{th}$ unit and the $m_{th}$ unit, $\Delta u_{qkm}$ is the q-axis component of the mutual voltage between the $k_{th}$ unit and is the $m_{th}$ unit, $\Delta i_{dk}$ is the d-axis component of the sub-synchronous current of the $k_{th}$ unit, $\Delta i_{qk}$ is the q-axis component of sub-synchronous current of the $k_{th}$ unit, $\Delta\theta_{km}$ is the interlocking phase angle between the $k_{th}$ unit and the $m_{th}$ unit, ω is frequency.

10. A stability control system for grid connected system of double-fed wind farm, comprising: acquisition module, data processing module and control module; wherein,
the acquisition module is configured to collect the operation state parameters of each of wind turbine generator units in the system;
the data processing module is configured to determine a mutual voltage between the units, an interlocking phase angle between the units, and a sub-synchronous current component of each unit according to the operation state parameters of each unit; and to determine an energy coefficient of each unit and then obtain a total energy coefficient according to the mutual voltage between the units, the interlocking phase angle between the units and the sub-synchronous current component of each unit;
the control module is configured to adjust the operation state parameters of each unit according to the total energy coefficient.

* * * * *